US012737835B2

(12) United States Patent
Hirosugi

(10) Patent No.: US 12,737,835 B2
(45) Date of Patent: Sep. 15, 2026

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Yuuka Hirosugi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 18/586,749

(22) Filed: Feb. 26, 2024

(65) Prior Publication Data

US 2024/0311957 A1 Sep. 19, 2024

(30) Foreign Application Priority Data

Mar. 13, 2023 (JP) ................................ 2023-038677

(51) Int. Cl.

*G06K 9/00* (2022.01)
*G06F 3/14* (2006.01)
*G06T 3/40* (2024.01)
*G06T 7/50* (2017.01)
*G06T 7/62* (2017.01)
*H04N 19/124* (2014.01)

(52) U.S. Cl.

CPC ................. *G06T 3/40* (2013.01); *G06F 3/14* (2013.01); *G06T 7/50* (2017.01); *G06T 7/62* (2017.01); *G06T 2207/20132* (2013.01); *G06T 2207/30176* (2013.01); *G06T 2207/30242* (2013.01)

(58) Field of Classification Search

USPC ....... 382/100, 103, 112, 113, 123, 155, 168, 382/173, 181, 199, 254, 305, 312; 707/812; 345/666, 660, 1.1; 375/E7.181

See application file for complete search history.

(56) References Cited

U.S. PATENT DOCUMENTS 10,115,178 B2 10/2018 Tamura et al.
2003/0058260 A1* 3/2003 Ohshima ................ H04N 1/393 345/666
2006/0067584 A1* 3/2006 Sato ..................... H04N 19/124 375/E7.181
2009/0268076 A1* 10/2009 Kawamura ........... H04N 23/61 348/333.12

(Continued)

FOREIGN PATENT DOCUMENTS

JP 2014-143673 A 8/2014

*Primary Examiner* — Seyed H Azarian
(74) *Attorney, Agent, or Firm* — Venable LLP

(57) ABSTRACT

An information processing apparatus includes: a reception unit configured to receive an instruction to change an aspect ratio of a document including an image arrangement region; an adjustment unit configured to change the aspect ratio of the document and also adjust an aspect ratio of the image arrangement region, based on the instruction received by the reception unit; a control unit configured to perform control to perform trimming of an image arranged in the image arrangement region based on the aspect ratio of the image arrangement region adjusted by the adjustment unit; and a display control unit configured to perform control to display the document in which the aspect ratio is changed based on the instruction and in which the image trimmed by the control unit is arranged in the adjusted image arrangement region, on a display unit.

10 Claims, 17 Drawing Sheets

(56) References Cited

U.S. PATENT DOCUMENTS

2012/0274539 A1* 11/2012 Tashiro .............. H04N 1/00442 345/1.1
2013/0124582 A1* 5/2013 Yamamoto .............. G06F 16/93 707/812
2014/0176612 A1* 6/2014 Tamura ..................... G06T 3/40 345/660
2015/0143237 A1* 5/2015 Shindo ................. H04N 1/3875 715/273

* cited by examiner

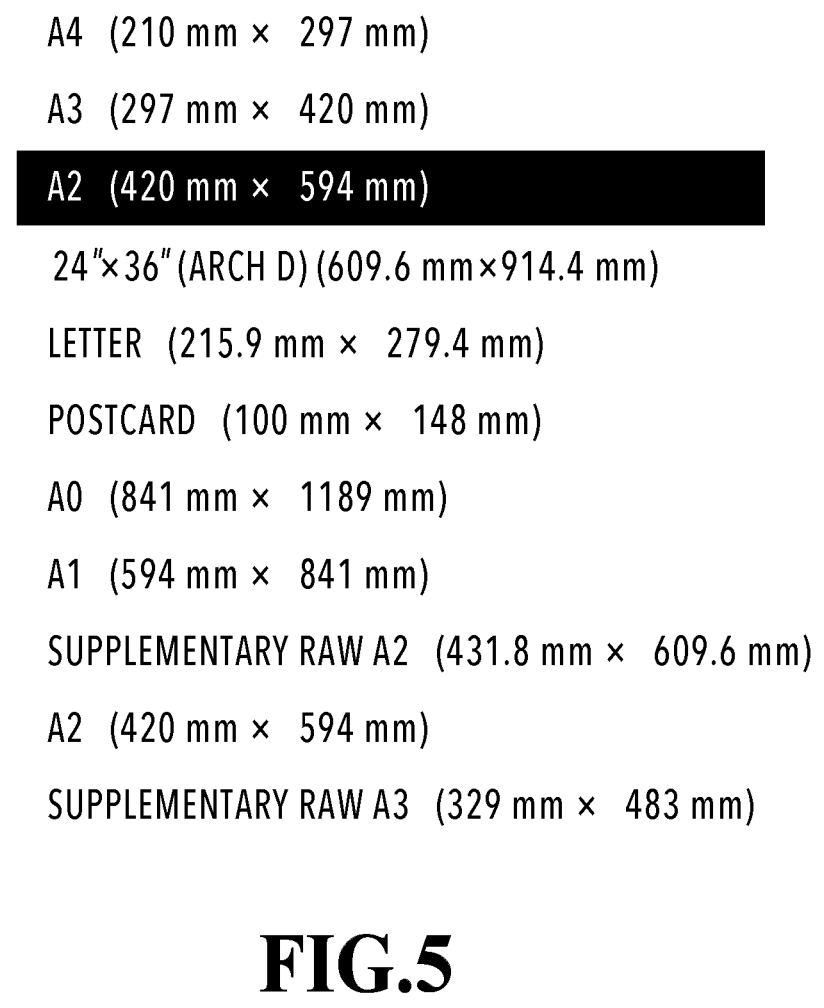

A4 (210 mm × 297 mm)

A3 (297 mm × 420 mm)

A2 (420 mm × 594 mm)

24"×36" (ARCH D) (609.6 mm×914.4 mm)

LETTER (215.9 mm × 279.4 mm)

POSTCARD (100 mm × 148 mm)

A0 (841 mm × 1189 mm)

A1 (594 mm × 841 mm)

SUPPLEMENTARY RAW A2 (431.8 mm × 609.6 mm)

A2 (420 mm × 594 mm)

SUPPLEMENTARY RAW A3 (329 mm × 483 mm)

FIG.5

ENTIRETY-ORIENTED

CENTRAL ARRANGEMENT

RULE OF THIRDS (UPPER LEFT)

RULE OF THIRDS (UPPER RIGHT)

RULE OF THIRDS (LOWER LEFT)

RULE OF THIRDS (LOWER RIGHT)

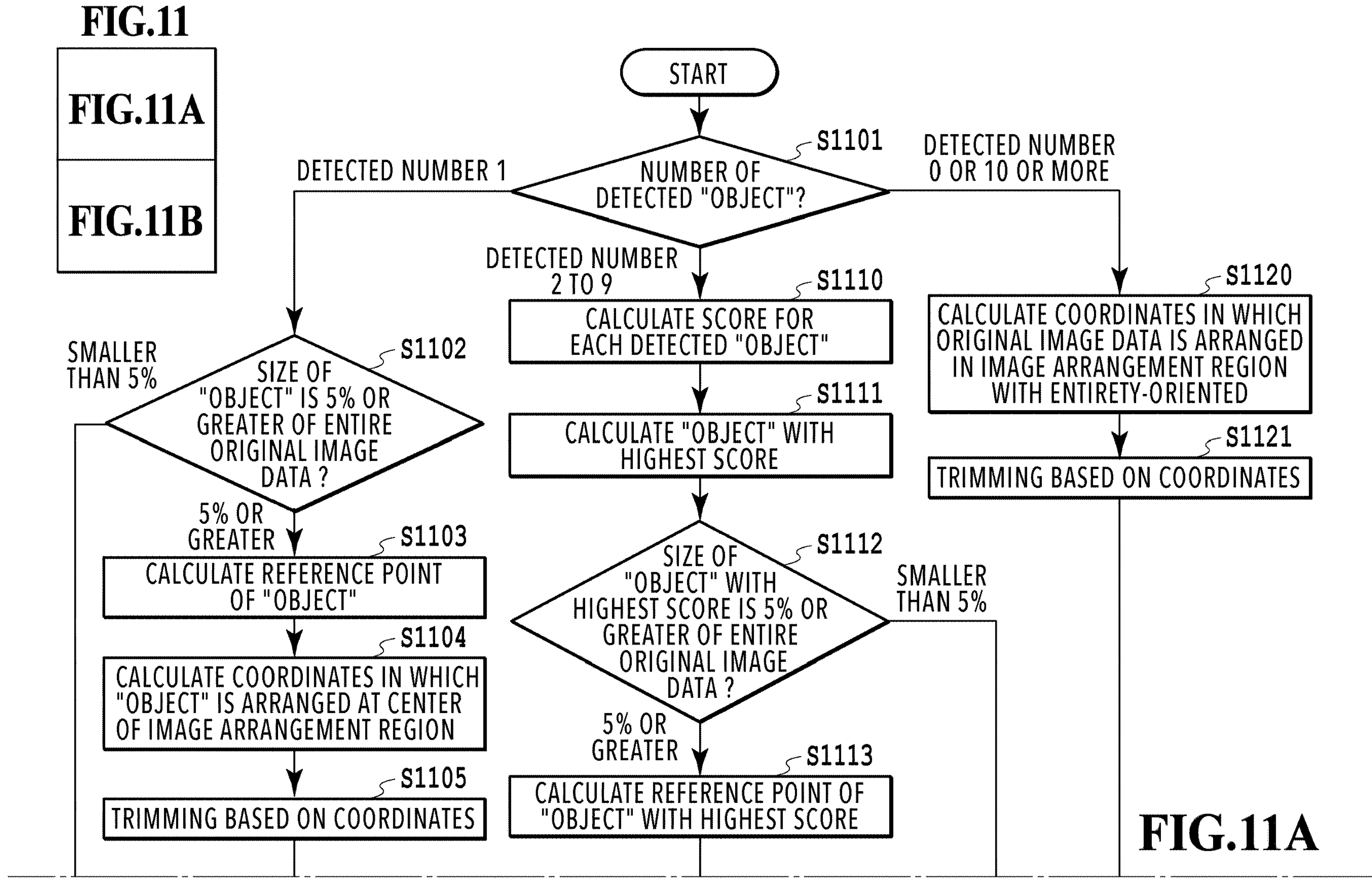
FIG.11
FIG.11A
FIG.11B
START
S1101
NUMBER OF DETECTED "OBJECT"?
DETECTED NUMBER 1
DETECTED NUMBER 2 TO 9
DETECTED NUMBER 0 OR 10 OR MORE
S1102
SIZE OF "OBJECT" IS 5% OR GREATER OF ENTIRE ORIGINAL IMAGE DATA ?
SMALLER THAN 5%
5% OR GREATER
S1103
CALCULATE REFERENCE POINT OF "OBJECT"
S1104
CALCULATE COORDINATES IN WHICH "OBJECT" IS ARRANGED AT CENTER OF IMAGE ARRANGEMENT REGION
S1105
TRIMMING BASED ON COORDINATES
S1110
CALCULATE SCORE FOR EACH DETECTED "OBJECT"
S1111
CALCULATE "OBJECT" WITH HIGHEST SCORE
S1112
SIZE OF "OBJECT" WITH HIGHEST SCORE IS 5% OR GREATER OF ENTIRE ORIGINAL IMAGE DATA ?
SMALLER THAN 5%
5% OR GREATER
S1113
CALCULATE REFERENCE POINT OF "OBJECT" WITH HIGHEST SCORE
S1120
CALCULATE COORDINATES IN WHICH ORIGINAL IMAGE DATA IS ARRANGED IN IMAGE ARRANGEMENT REGION WITH ENTIRETY-ORIENTED
S1121
TRIMMING BASED ON COORDINATES
FIG.11A

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present disclosure relates to an information processing apparatus capable of displaying a document in which an image is arranged, a method of controlling the information processing apparatus, and a storage medium.

Description of the Related Art

There has been used a method of editing a document by using an application on a personal computer. In such a document editing method, it is possible to change the sheet size of the document to any size. In a case of changing the sheet size of the document, the application adjusts an original document by enlarging or reducing an object in the document such as a text and an image according to the change of the sheet size. A photograph is trimmed based on a size and a shape of an image arrangement region and is displayed on the document.

In this case, once an aspect ratio is adjusted according to the change of the sheet size, an aspect ratio of the image arrangement region is changed. Depending on the shape of the image arrangement region after the adjustment, an "object" may be partially cut off at a trimming position that is not changed from before the adjustment. Japanese Patent Laid-Open No. 2014-143673 (hereinafter, referred to as Document 1) discloses a technique of calculating some candidates of the trimming position by specifying the position of the "object" in the photograph while assuming a photograph captured by a digital camera or the like.

However, in the technique of Document 1, although it is possible to calculate the trimming position in which the "object" is at the center, a trimming result in which the "object" does not fit within the image arrangement region is also generated. Therefore, there is still a problem that the "object" is partially cut off from the image arrangement region.

SUMMARY OF THE INVENTION

An information processing apparatus of the present disclosure includes: a reception unit configured to receive an instruction to change an aspect ratio of a document including an image arrangement region; an adjustment unit configured to change the aspect ratio of the document and also adjust an aspect ratio of the image arrangement region, based on the instruction received by the reception unit; a control unit configured to perform control to perform trimming of an image arranged in the image arrangement region based on the aspect ratio of the image arrangement region adjusted by the adjustment unit; and a display control unit configured to perform control to display the document in which the aspect ratio is changed based on the instruction and in which the image trimmed by the control unit is arranged in the adjusted image arrangement region, on a display unit.

Further features of the present disclosure will become apparent from the following description of exemplary embodiments with reference to the attached drawings.

BRIEF DESCRIPTION OF THE DRAWINGS

FIG. 5 is a diagram illustrating a sheet size selection screen;

DESCRIPTION OF THE EMBODIMENTS

Figure 1:
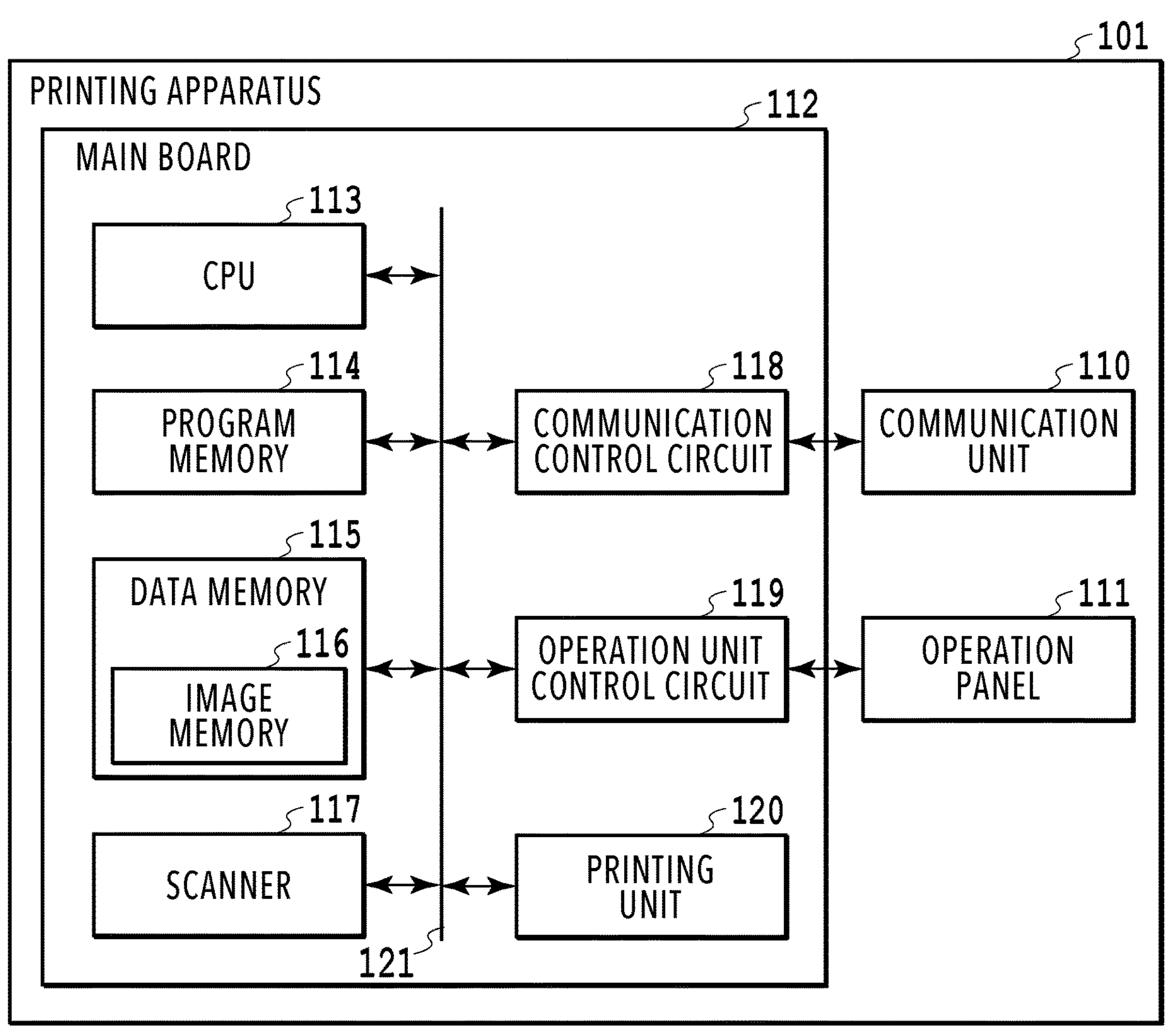
FIG. 1 is a block diagram illustrating an example of a hardware configuration of a printing apparatus.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts and the sequence charts is denoted by a reference numeral starting with S.

Additionally, in the present disclosure, an "object" is used as a term indicating a target of image capturing. An image object that can be operated on a personal computer has a different meaning from the "object".

First Embodiment

Hereinafter, processing of a document editing application on a personal computer according to the present embodiment is described with reference to the drawings. Document data that is an editing target of the document editing application may be document data of a general office document or may be document data of a document for a specific application such as a poster, a postcard, or presentation data. Additionally, the document editing application has various functions to edit the document data, and it is possible to resize, move, or rotate the object in the document data and to perform trimming processing and the like on the image object.

<About Hardware Configuration and Application>

FIG. 1 is a block diagram illustrating a hardware configuration of a printing apparatus 101 according to the present embodiment. The printing apparatus 101 includes a main board 112 that performs overall control, a communication unit 110, and an operation panel 111. In this case, the communication unit 110 functions as a communication unit of the printing apparatus 101. The communication unit 110 may be a wireless LAN unit; however, it is not limited to the above unit. For example, a Bluetooth (registered trademark) unit, a wired LAN unit, or the like may be applied.

The main board 112 includes a CPU 113, a program memory 114, a data memory 115 including an image memory 116, a scanner 117, a communication control circuit 118, an operation unit control circuit 119, and a printing unit 120. The above-described devices are connected to each other through an internal bus 121. The CPU 113 operates according to a control program stored in the program memory 114 in the form of a ROM and data in the data memory 115 in the form of a RAM that are connected through the internal bus 121. The CPU 113 reads an original document by controlling the scanner 117 and stores the read document data into the image memory 116 in the data memory 115.

Additionally, the CPU 113 can print the document data in the image memory 116 in the data memory 115 on a printing medium by controlling the printing unit 120. Moreover, it is also possible to transmit the scanned document data to a central processing unit 202 of a personal computer 200 through the communication unit 110 controlled by the communication control circuit 118. The CPU 113 establishes the communication with the central processing unit 202 of the personal computer 200 by controlling the communication unit 110 by using the communication control circuit 118. The CPU 113 can display a state of the printing apparatus 101 and a function selection menu on the operation panel 111 and can receive an operation from a user by controlling the operation unit control circuit 119. The printing apparatus 101 according to the present embodiment can receive and print the document data in various data formats such as a JPEG file format.

Figure 2:
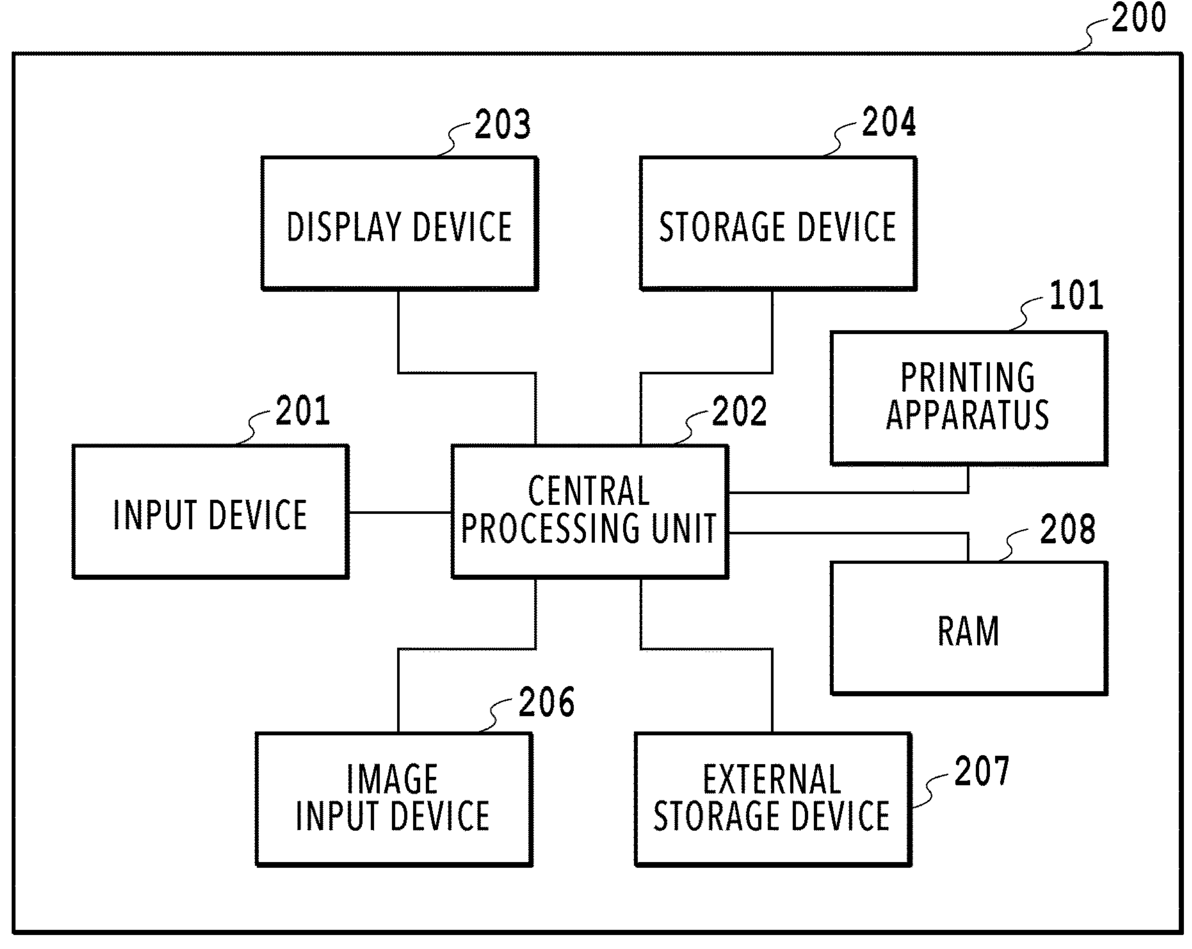
FIG. 2 is a block diagram illustrating an example of a hardware configuration of a personal computer.

FIG. 2 is a block diagram illustrating a hardware configuration of the personal computer 200 operated by a document editing application 301 according to the present embodiment. The personal computer 200 includes an input device 201, the central processing unit 202, a display device 203, and a storage device 204. The input device 201 is a device such as a keyboard and a mouse that receives an input from the user. The central processing unit 202 includes at least one processor and operates according to a program and data stored in the storage device 204 to control the personal computer 200. The display device 203 is a display device such as a liquid crystal monitor that displays the document data and the like being processed by the personal computer 200. Additionally, the display device 203 may be combined with the input device 201 and may be an operation panel, a touch panel, or the like, for example. The storage device 204 stores not only the above-described program and data used by the central processing unit 202 but also an entity of the document editing application 301, a document template, a font, a decorative data, and the like. The storage device 204 may be an internal hard disk, an internal SSD, an external storage medium of a memory card or the like. ARAM 208 is a memory (storage medium) that functions as a working memory in a case of executing a program. In this case, it is assumed that the personal computer 200 is a desktop personal computer or a laptop personal computer; however, it is not limited thereto. For example, a smartphone, a tablet terminal, a personal digital assistant (PDA), and so on are also included in the personal computer 200 of the present embodiment.

The personal computer 200 may include the printing apparatus 101, an image input device 206, or an external storage device 207. Description of the printing apparatus 101 is omitted. The image input device 206 includes a film scanner, a flatbed scanner, a digital camera, and the like; however, it is not limited thereto. For example, the image input device 206 may be the scanner 117 of the printing apparatus 101 described above. The external storage device 207 is an external storage device corresponding to a medium used in the digital camera or the like. It is also possible to import image data stored in the external storage device 207 into the document data as the object. The external storage device 207 may be an external hard disk, an SSD, a USB memory, an SD card, or the like; however, it is not limited thereto. The external storage device 207 may be a cloud storage with which the personal computer 200 can be connected through a network by using a not-illustrated communication interface (IF).

Figure 3:
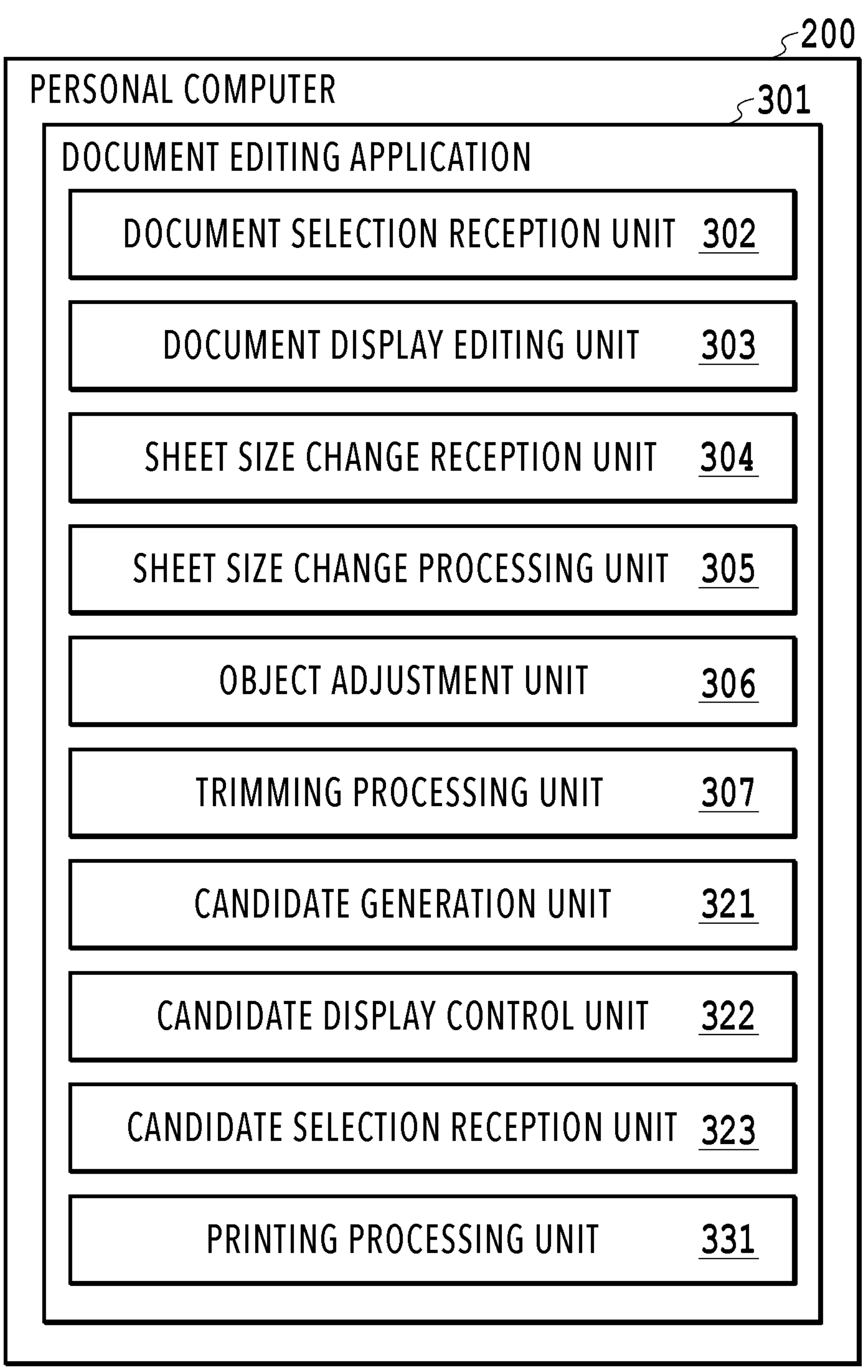
FIG. 3 is a block diagram illustrating an example of a configuration of the personal computer.

FIG. 3 is a block diagram illustrating a functional configuration of the document editing application 301 that operates on the personal computer 200 that is a mode of an information processing apparatus. As an entity, each of the functions of all the functional blocks illustrated in FIG. 3 is a function that is executed by the central processing unit 202 based on a program of the document editing application 301. A document selection reception unit 302 selects the document data to be edited. A document display editing unit 303 displays and edits the document data selected by the document selection reception unit 302. A sheet size change reception unit 304 receives a change of the sheet size of the document being edited by the document display editing unit 303. A sheet size change processing unit 305 changes the sheet size of the document data according to the sheet size changed by the sheet size change reception unit 304. In a case where the sheet size is changed by the sheet size change processing unit 305, an object adjustment unit 306 performs adjustment such as resizing, moving, rotating, and the like on each object included in the document data being edited by the document display editing unit 303 according to the changed sheet size. In a case where the image object is adjusted by the object adjustment unit 306, a trimming processing unit 307 performs trimming processing on an arranged image based on a shape of an image arrangement region included in the changed image object. In response to processing results from the sheet size change reception unit 304, the sheet size change processing unit 305, the object adjustment unit 306, and the trimming processing unit 307, a candidate generation unit 321 generates candidates of the document data after the sheet size is changed. A candidate display control unit 322 displays the candidates of the document data that are generated by the candidate generation unit 321 in a particular order. A candidate selection reception unit 323 receives the candidates of the document data that are displayed by the candidate display control unit 322 and selected by the user. A printing processing unit 331 generates printing data from the document data and transmits an instruction to print the printing data to the printing apparatus 101.

<About Processing of Changing Size of Image Object>

Figure 4A:
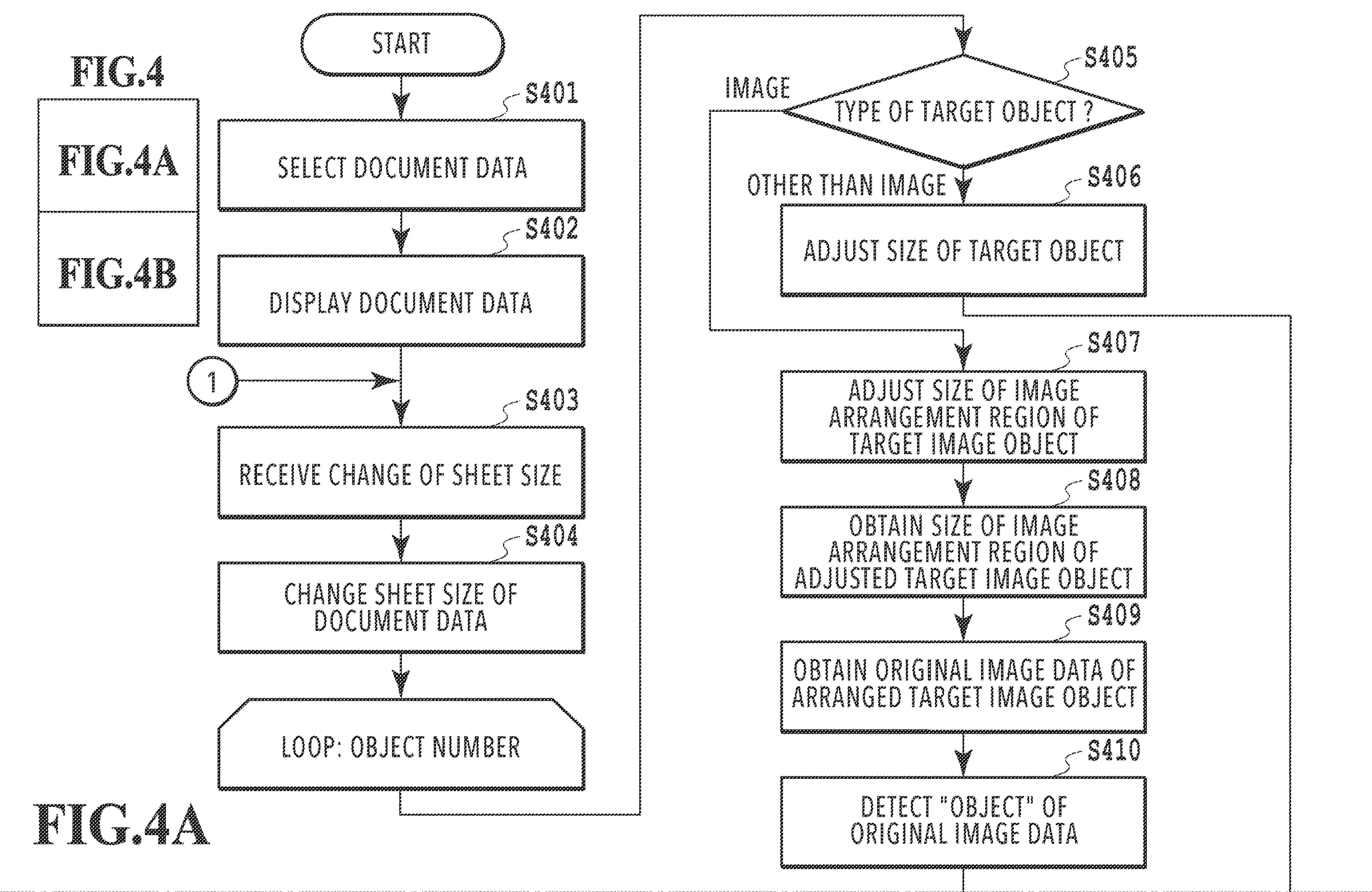
FIG. 4 is a diagram showing the relationship of FIGS. 4A and 4B, and FIGS. 4A and 4B are flowcharts illustrating processing of a document editing application.
Figure 4B:
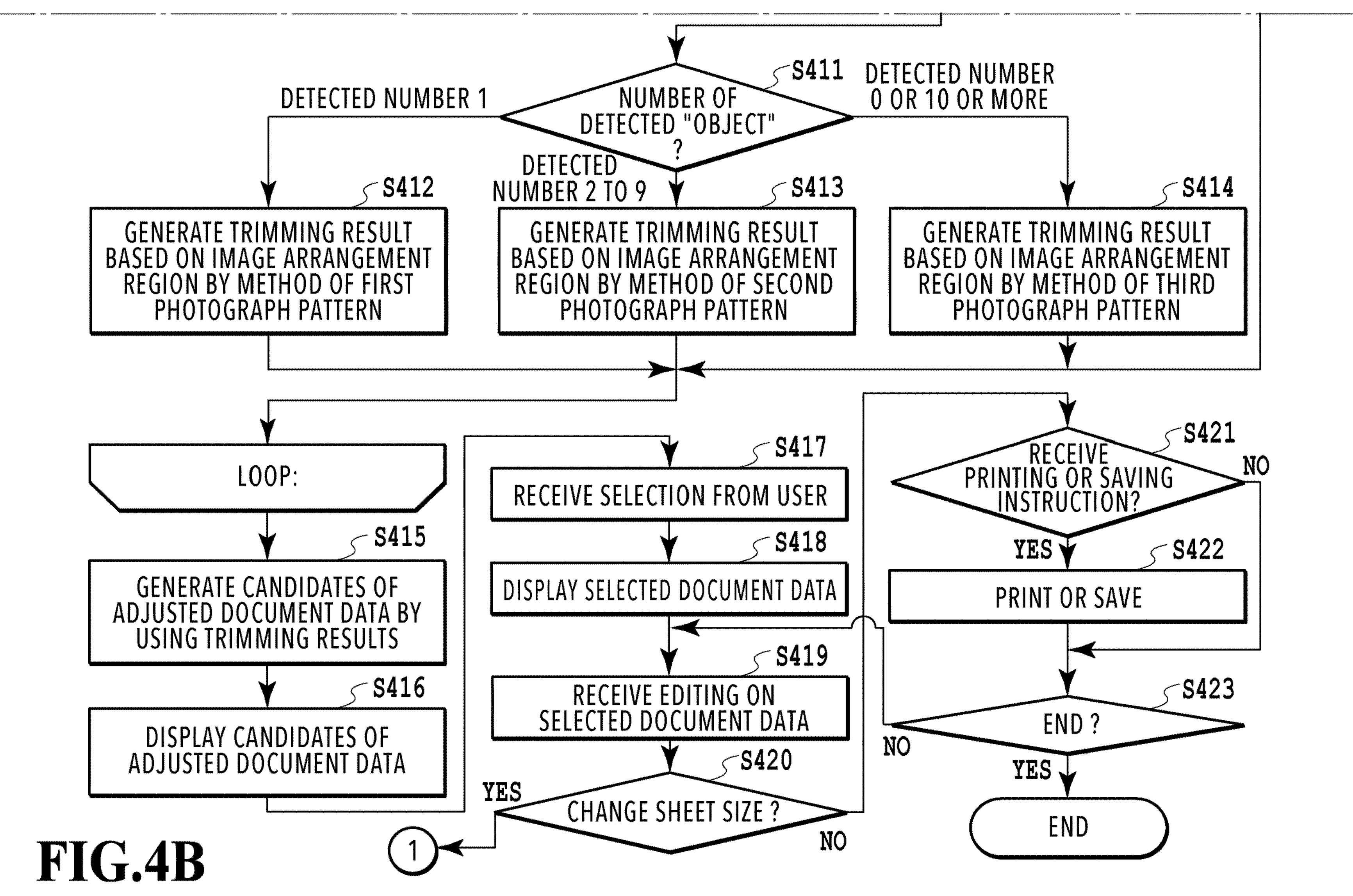

FIGS. 4A and 4B are flowcharts illustrating processing by the document editing application 301. This processing is implemented with the program stored in the storage device 204 being deployed to the RAM 208 and executed by the central processing unit 202. The processing in the flowcharts in FIGS. 4A and 4B is started with the user activating the document editing application 301.

In S401, the central processing unit 202 receives the selection of the document data to be edited. The storage device 204 stores as templates in advance various document data corresponding to the purpose of use, and the document editing application 301 displays a list of the document templates on the display device 203 to receive the selection from the user. The user selects the document data that the user wants to use from the document template list displayed on the display device 203 by the input device 201. Note that, the document data may be selected from templates prepared in advance, or a document that is created by the user in the past may be selected. In a case where the user selects the document data, the processing proceeds to S402.

In S402, according to the selection by the user in S401, the central processing unit 202 opens the document data stored in the storage device 204 and displays the document data on the display device 203. The document data displayed on the display device 203 is in a state in which the document can be edited through the input device 201. In a case where the document data is displayed on the display device 203, the processing proceeds to S403.

In S403, the central processing unit 202 receives an operation to change the sheet size of the document displayed in S402 from the user and informs the sheet size change reception unit 304 of the changed sheet size. In the changing of the sheet size, a list of sheet sizes illustrated in FIG. 5 is displayed on the display device 203, and the user selects a desired sheet size by using the input device 201. In a case where the document template is created in A2 size, A2 is selected as default, and the user may change it into a desired size. A case of changing the sheet size may be a case where the sheet on which the document data is to be printed by the printing apparatus 101 has a different sheet size from the document template. In addition to displaying the sheet sizes using a list, whether to use the sheet in a portrait orientation (a vertical direction) or a landscape orientation (a horizontal direction) may be selected, or any size may be set by the user using a numerical value. In a case where the user changes the sheet size, the processing proceeds to S404.

In S404, the central processing unit 202 changes the sheet size of the document data displayed in S402 according to the changed sheet size received by the sheet size change reception unit 304 in S403. Thus, the size of the document is changed. In a case where the processing of changing the sheet size is completed, processing indicated in S405 to S414 is executed. In S405 to S414, one object in the document data is a target object, and the size and the position of the target object in the document data are adjusted according to the type and the arrangement state of the object so as to be appropriate for the changed sheet size. The processing indicated in S405 to S414 is repeated until the processing on all the objects in the document data is completed.

In S405, the central processing unit 202 determines whether the type of the target object that is the one object in the document data is an image. The type of the object is the image, a graphic, a text, or the like, and the central processing unit 202 performs the determination with reference to information associated with the target object. In a case where it is determined that the target object is not the image, the processing proceeds to S406. In a case where it is determined that the target object is the image, the processing proceeds to S407.

In S406, the central processing unit 202 adjusts the size according to the target object. As an example of the processing in S406, a case where it is determined in S405 as a text object is described. In a case of the text object (hereinafter, referred to as "text"), first, the processing diverges depending on whether there is another object immediately below the target text. The determination on whether there is the other object immediately below the target text is performed based on region information on the target text and an object in a layer lower than that of the target text. In a case where the other object having a region that completely contains the region of the target text is in the lower layer, it is determined that there is the other object immediately below the target text. In a case where there is no other object immediately below the target text, the font size of the text is enlarged or reduced according to a magnification of a side out of the sides of the sheet that has a smaller scaling rate. For example, in a case where the sheet size of 100 cm height×50 cm width is changed to the sheet size of 50 cm height×30 cm width, the font size is reduced into half based on 50/100 according to the magnification of the vertical side that has a smaller scaling rate. In this case, although the font size is changed, an aspect ratio of the font is not changed. This is because, in a case where a change amount in the sheet size is great, the font is distorted in a case where the aspect ratio of the font is changed, and this gives a different impression from the original text design.

Figure 6A:
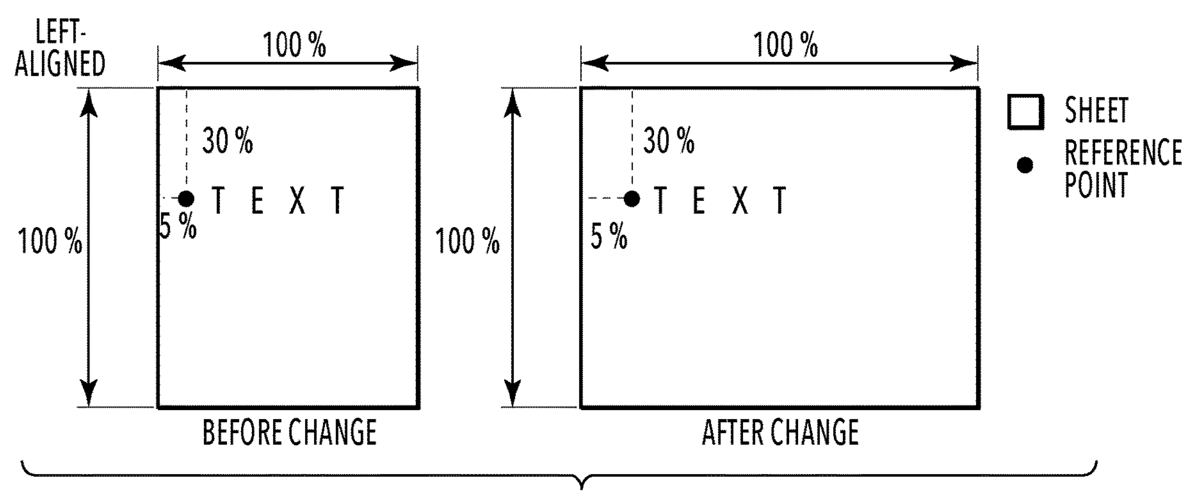
FIGS. 6A to 6C are diagrams each illustrating a method of arranging a text.
Figure 6B:
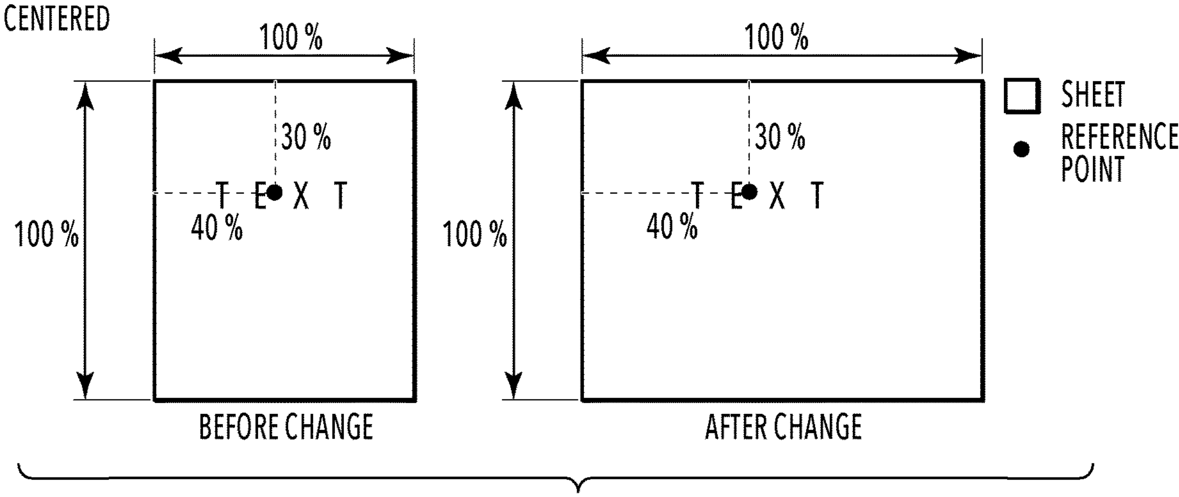
Figure 6C:
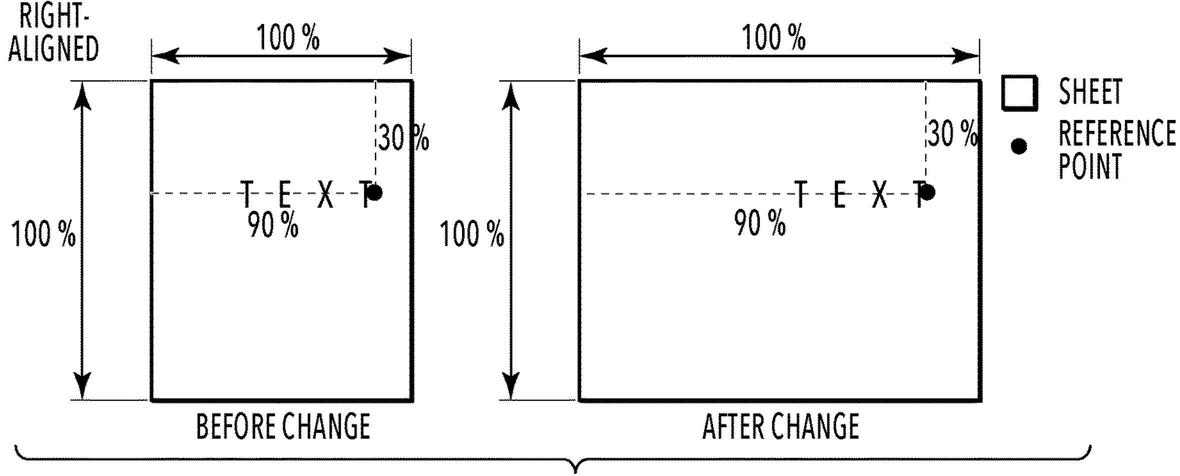

Subsequently, in moving processing, the central processing unit 202 moves the target object according to the change of the aspect ratio of the sheet size. As illustrated in FIGS. 6A to 6C, the target object is moved such that a reference point of the text has the same positional proportion between before and after the sheet size is changed. As illustrated in FIGS. 6A to 6C, the reference point in a case of the moving is different depending on alignment setting of the text (left-aligned, centered, and right-aligned). In a case of left-aligned, the reference point is at the center on the left side of the text, in a case of centered, the reference point is at the center of the text, and in a case of right-aligned, the reference point is at the center on the right side of the text. Note that, in a case where the text is written vertically, the reference point is at the center on the upper side of the text, at the center of the text, and at the center on the lower side of the text according to the alignment setting. With the change in the reference point as described above, for example, it is possible to move each text while aligning the positions of left ends in a case of changing the sheet size of a document in which plural left-aligned texts are vertically aligned at left ends. Thus, the layout is not distorted.

Figure 7:
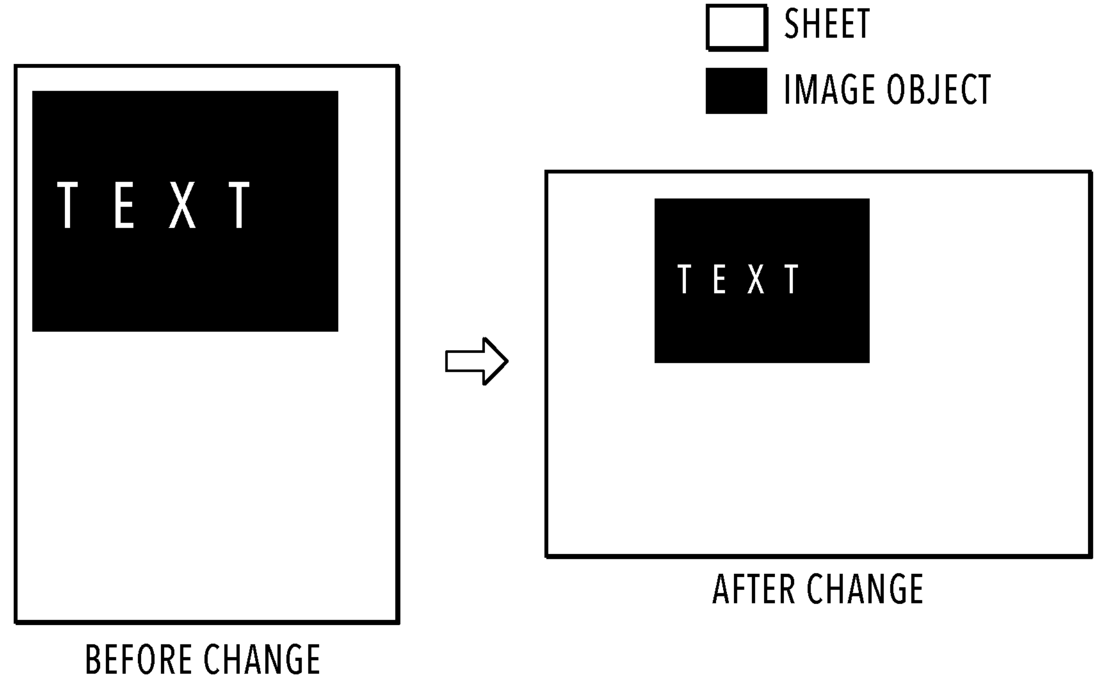
FIG. 7 is a diagram illustrating an example of a method of arranging the text in an image object.

In a case where there is the other object immediately below the target text, the central processing unit 202 performs the enlarging or reducing and the moving so as to maintain the relative size relationship and positional relationship with the other object immediately below the target text. For example, as illustrated in FIG. 7, in a case where there is the image object illustrated as a black graphic in an upper portion of the document data, and there is the text on the left side in the image object, the following processing is performed. That is, the central processing unit 202 reduces the font of the text according to the reduction of the image object and arranges the text in a position on the left side in the black graphic. In the example in FIG. 7, the text is left-aligned; for this reason, the reference point is at the center on the left side of the text, and the text is arranged in the image object so as not to change the positional relationship between the image object and the reference point of the text. Thus, with the enlarging or reducing and the moving performed according to the other object immediately below the target text, imbalance of the arrangement relationship between the target text and the object immediately below the target text is prevented. In a case where the processing on all the objects in the document data is completed, the processing proceeds to S415. In a case where the processing on all the objects in the document data is not completed, the processing returns to S405.

In S405, if the central processing unit 202 determines that the target object is the image, in S407, the central processing unit 202 adjusts the size of the image arrangement region of the target object. The image arrangement region is a frame that determines a shape displayed on the document in the image set as the image object, and the image object is formed of original image data and the image arrangement region. Since the image object is trimmed based on the image arrangement region and then is displayed (arranged) on the document, for example, in a case where the image arrangement region is star-shaped, the original image data is cut out into the star shape and displayed on the document. In a case where the image arrangement region is rectangular, the original image data is cut out into the rectangular shape and displayed on the document data. In a case where the image arrangement region is great, the image object is displayed to have a great area on the document data. In a case where the image arrangement region is small, the image object is displayed to have a small area on the document data. In the present embodiment, the trimming indicates processing of generating the image object as an appearance that is displayed on the document data based on the shape and size of the image arrangement region and the original image data. Note that, the original image data included in the image object is never deformed by the trimming. Additionally, the trimming may be performed not only based on both the size and shape of the image arrangement region but also based on either one of the size and shape of the image arrangement region.

Figure 8A:
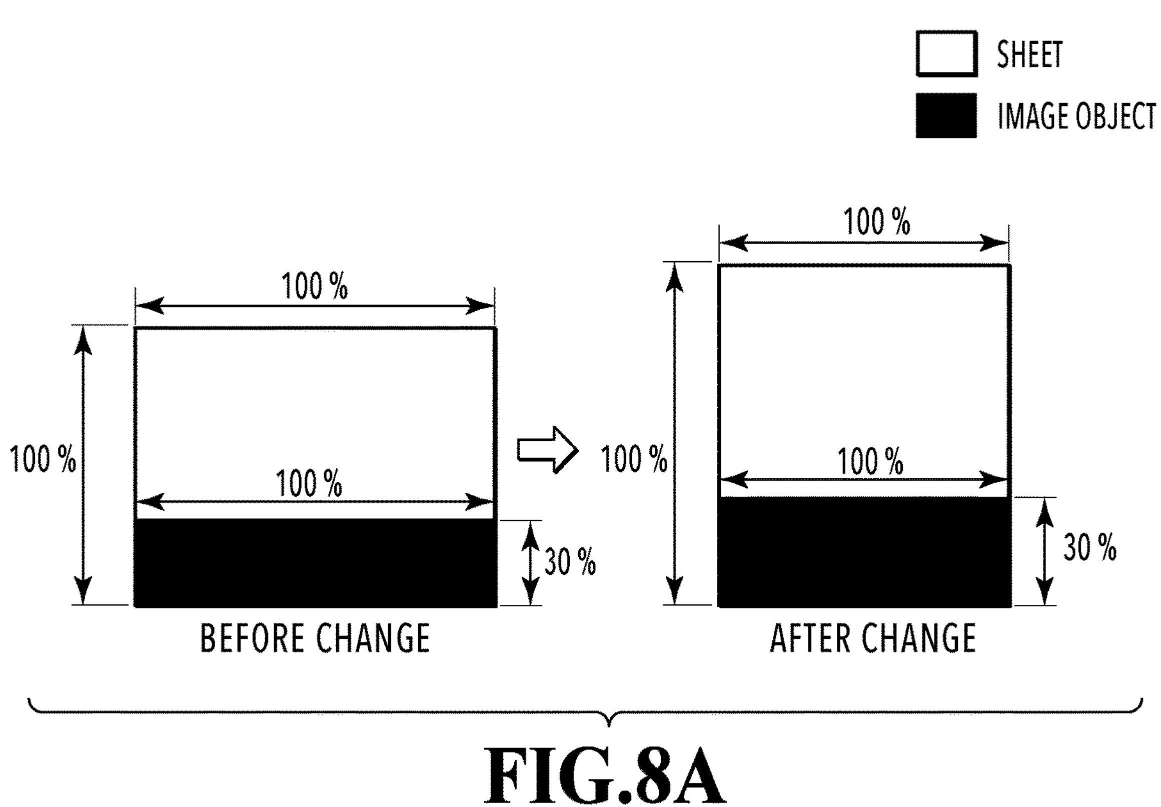
FIGS. 8A and 8B are diagrams each illustrating a method of arranging the image object.
Figure 8B:
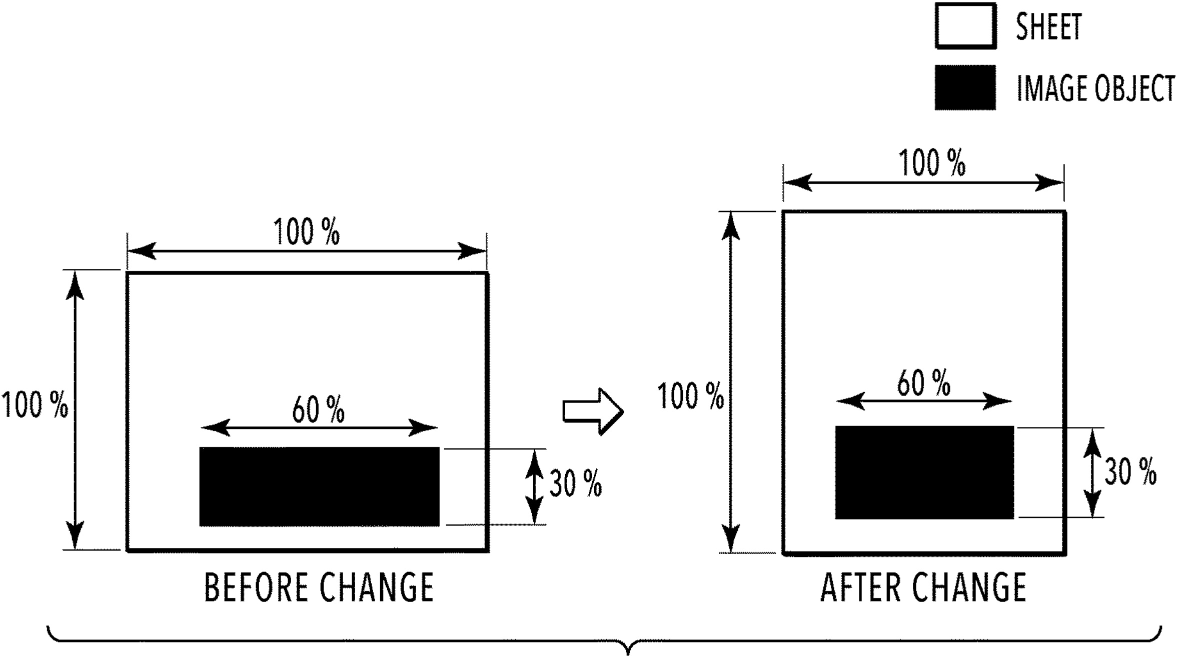

In the size adjustment processing of the image arrangement region, the processing diverges depending on whether there is another object immediately below the image object. In a case where there is no other object immediately below the image object, as illustrated in FIGS. 8A and 8B, the central processing unit 202 performs enlarging or reducing and moving of the image object so as to maintain the proportion of the image arrangement region to the entire sheet. In this case, the aspect ratio of the image arrangement region is not maintained. In a case where there is the other object immediately below the image object, the central processing unit 202 performs the enlarging or reducing and the moving of the image object so as to maintain the relative size relationship and positional relationship with the other object immediately below the image object. In a case where the size adjustment of the image arrangement region of the target image object is completed, the processing proceeds to S408.

Figure 9:
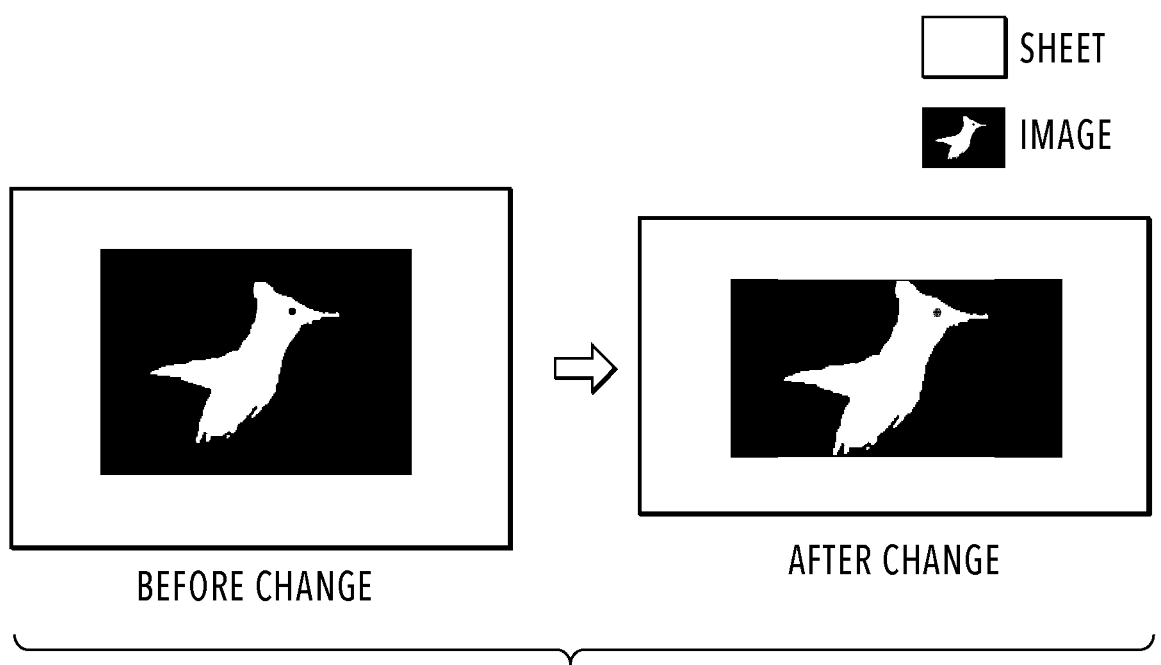
FIG. 9 is a diagram illustrating an example of trimming of the image object.

In S408, the central processing unit 202 obtains the size of the image arrangement region of the target image object adjusted in S407, and the processing proceeds to S409. The later-described trimming processing is performed according to the aspect ratio of the image arrangement region adjusted in S407 (performed based on the aspect ratio). Specifically, for example, in a case where the changed image arrangement region is horizontally long as illustrated in FIG. 9, the central processing unit 202 trims the original image data at the horizontally long aspect ratio that is the same as the image arrangement region. Likewise, in a case where the changed image arrangement region is vertically long, the central processing unit 202 trims the original image data at the vertically long aspect ratio that is the same as the image arrangement region.

In S409, the central processing unit 202 obtains the original image data including the target image object, and the processing proceeds to S410. The image data obtained in this process (that may be simply referred to as the image) is the pre-trimming original data (for example, an image file) of the image arranged in the image arrangement region of the document data that is already displayed before the sheet size is changed. In S410, the central processing unit 202 detects the “object” shown in the image from the original image data. In the present embodiment, an object detection system (hereinafter, referred to as “object detection”) by deep learning is used to detect the “object”. In a case where the detection of the “object” from the original image data is completed, the processing proceeds to S411. In S411, the central processing unit 202 calculates the number of the “object” detected in S410. In a case where the number of the detected “object” is one, the processing proceeds to S412. In a case where the number of the detected “object” is two to a number smaller than a predetermined number, the processing proceeds to S413. In a case where the number of the detected “object” is zero or a number equal to or greater than the predetermined number, the processing proceeds to S414. In the above-described example, the predetermined number is set to ten; however, it is not limited thereto. The predetermined number may be set by inputted by the user.

In S412, S413, or S414, the central processing unit 202 determines a pattern of the image based on the number of the “object”, trims the target object by using a proper trimming method for each pattern, and generates a trimming result. Hereinafter, the pattern is referred to as a “photograph pattern”. The trimming method used in S412 is a first photograph pattern, the trimming method used in S413 is a second photograph pattern, and the trimming method used in S414 is a third photograph pattern. Note that, the method of the first photograph pattern, the method of the second photograph pattern, and the method of the third photograph pattern are described later. In a case where the trimming result of the target object is generated in S412, S413, or S414, the central processing unit 202 determines whether the processing on all the objects in the document data is completed. In a case where the processing on all the objects in the document data is completed, the processing proceeds to S415. In a case where the processing on all the objects in the document data is not completed, the processing returns to S405.

In S415, the central processing unit 202 generates plural candidates of the adjusted document data by using the result of each object, and the processing proceeds to S416. In S416, the central processing unit 202 displays the plural candidates of the document data generated in S415 on the display device 203. That is, there are displayed plural documents at the changed aspect ratio in which plural trimmed images trimmed in different trimming ranges by using the image of the original data of the image arranged before the aspect ratio is changed are arranged in the adjusted image arrangement region. The display example in S416 is described later with reference to FIG. 12.

In S417, the central processing unit 202 receives a user operation to select one of the plural candidates of the document data displayed on the display device 203. In S418, the central processing unit 202 determines (confirms) the candidate selected in S417 and displays the selected document data on the display device 203 as an editing target. In S419, the central processing unit 202 receives an editing operation from the user on the document data that is selected in S417 and displayed as the editing target in S418 and performs various editing processing according to the editing operation. For example, it is possible to receive the editing operation such as an adjustment operation of the display range (trimming range) of the image displayed in the image arrangement region, an adjustment operation of the size, the position, and the shape of the image arrangement region itself, additional arrangement of the image, and deletion of the arranged image.

In S420, the central processing unit 202 determines whether there is an operation to change (an instruction to change) the sheet size of the document data as the editing target. In a case where there is the instruction to change the sheet size, the processing proceeds to S403. In a case where there is no instruction to change the sheet size, the processing proceeds to S421. In S421, the central processing unit 202 determines whether there is a printing instruction or a saving instruction of the document data as the editing target. In a case where there is the printing instruction or the saving instruction, the processing proceeds to S422. In a case where neither the printing instruction nor the saving instruction is issued, the processing proceeds to S423.

In S422, in a case where the central processing unit 202 receives the printing instruction in S421, the central processing unit 202 generates the printing data of the document data as the editing target and transmits the printing data to the printing apparatus 101 to give the printing instruction. Thus, the document that reflects the contents edited by the processing described above is outputted to the printing apparatus 101 in a printable state and is printed by the printing apparatus 101. For example, a poster in which an image and a character are arranged as a document is printed. Additionally, in a case where the saving instruction is received in S421, the central processing unit 202 saves the document data as the editing target in the storage device 204. Thus, the document that reflects the contents edited by the processing described above is outputted to the storage device 204 and saved. Moreover, the document data that reflects the edited contents may be transmitted to a server and the like on a network according to an instruction from the user. With the document data transmitted to the server, it is possible to place an order of the printing of the document with a printing company and the like or to post the document data on a social networking service (SNS) and the like and display the document based on the document data on a screen of the SNS. In S423, the central processing unit 202 determines whether there is an operation to close (end) the document editing application 301. In a case where there is no operation to close the document editing application 301, the processing proceeds to S419 and repeats the processing. In a case where there is the operation to close the document editing application 301, the processing in FIGS. 4A and 4B is finished.

Note that, although an example in which the plural candidates of the document data are generated in S415 and displayed in S416 is described in the above-described example, a method of the processing is not limited thereto. One adjusted document data using the trimming result may be generated in S415, and the document data generated in S415 may be displayed in S418 as the editing target without S416 and S417. In this way, it is also possible to reduce the effort of the user to select from the plural candidates.

<About Trimming Processing of Image Object>

Figure 10A:
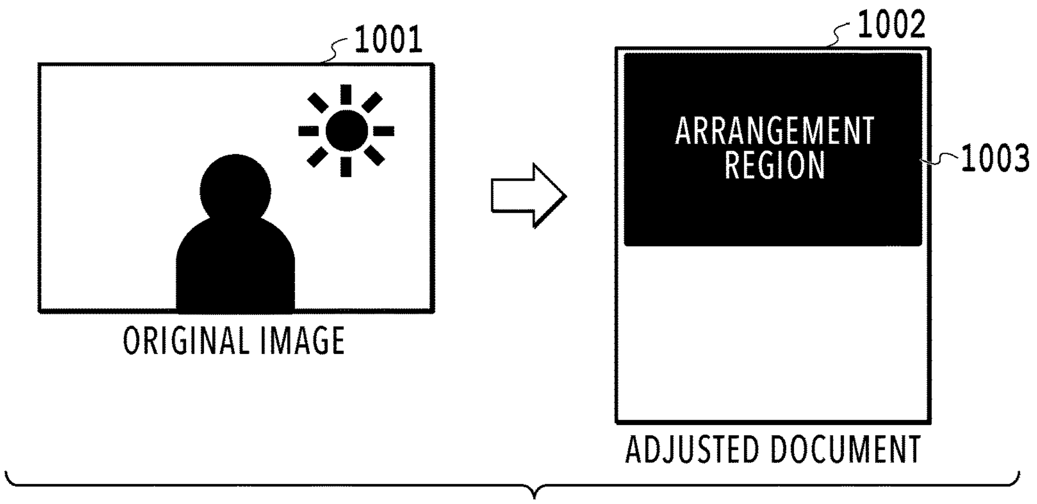
FIGS. 10A to 10G are diagrams each illustrating a method of arranging an "object"

In the processing in S411 to S414 in the flowchart illustrated in FIG. 4B, after the central processing unit 202 performs the processing according to the photograph pattern, the trimming position is determined so as to arrange the "object" in the image arrangement region according to a particular rule. FIGS. 10A to 10G are diagrams illustrating the method of arranging the "object". FIG. 10A illustrates an example in which original image data 1001 is trimmed and arranged in an image arrangement region 1003 in adjusted document data 1002. As illustrated in FIGS. 10B to 10G, the original image data is arranged and trimmed by up to six methods indicated by arrangement examples 1004 to 1009 of the "object". Note that, the arrangement method of the "object" is not limited to the above-described six methods.

Figure 10B:
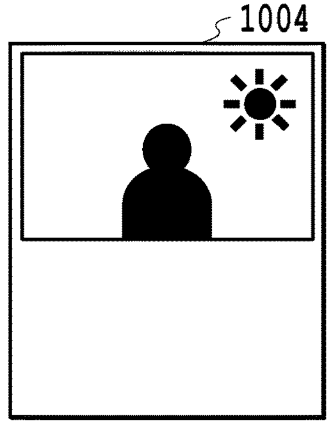

The arrangement example 1004 illustrated in FIG. 10B is the arrangement method to arrange the original image data 1001 such that the entirety fits within the image arrangement region 1003 as much as possible. Hereinafter, this arrangement method is referred to as an "entirety-oriented arrangement method". In the arrangement method, the trimming is performed such that a short side of the original image data 1001 matches a corresponding side of the image arrangement region 1003. In a case of the original image data 1001, the short side corresponds to the height. For this reason, the central processing unit 202 arranges the original image data 1001 in the image arrangement region 1003 such that the height of the original image data 1001 matches the height of the image arrangement region 1003. Additionally, in this arrangement method, the central processing unit 202 does not refer the coordinates of the "object". In this arrangement method, the center of the original image data 1001 matches the center of the image arrangement region, and at least one of a vertical range and a horizontal range of the whole image fits within the image arrangement region.

Figure 10C:
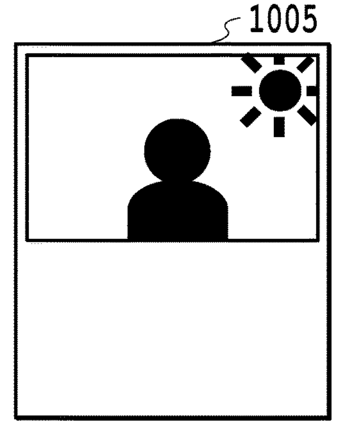
Figure 10C:
Figure 10D:
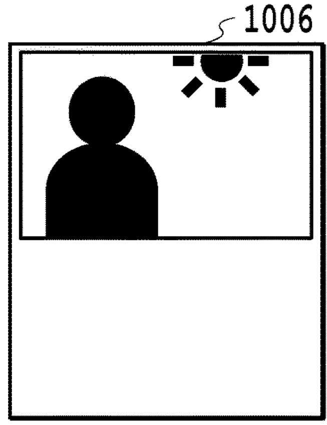
Figure 10E:
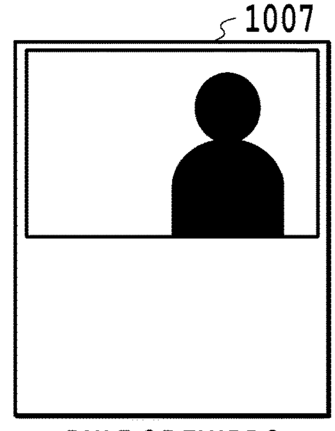
Figure 10F:
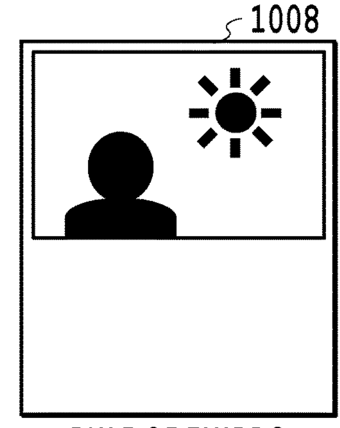
Figure 10G:
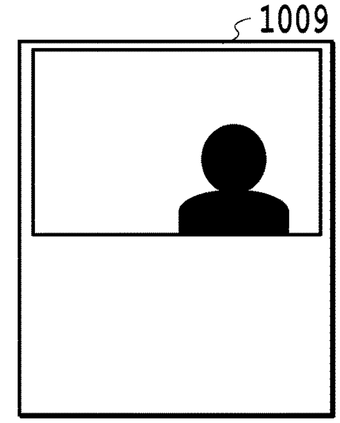

The arrangement example 1005 illustrated in FIG. 10C is an arrangement method to arrange the original image data 1001 such that the coordinates of the reference point of the "object" match the coordinates of the center of the image arrangement region 1003. Hereinafter, this arrangement method is referred to a "central arrangement". The arrangement example 1005 illustrates the trimming result in a case where a head of a person in the original image data 1001 is detected as the "object", and the central processing unit 202 arranges the "object" at the center of the image arrangement region 1003.

The arrangement examples 1006 to 1009 illustrated in FIGS. 10D to 10G are arrangement methods to arrange the "object" such that the coordinates of four intersections of lines that divide the image arrangement region 1003 into three vertically and horizontally match the coordinates of the reference point of the "object", respectively. These arrangement methods are referred to as "rule of thirds". In the arrangement methods, four patterns of trimming results in which the reference point of the "object" is arranged in the four intersections, respectively, are obtained. The arrangement examples 1006 to 1009 illustrate the trimming results in a case where the head of the person in the original image data 1001 is detected as the "object", and the central processing unit 202 arranges the "object" in upper left, upper right, lower left, and lower right, respectively.

Use of one of the above-described various arrangement methods that is appropriate for the photograph pattern for the document data or the trimming of one image object (photograph) by using the plural arrangement methods makes it possible to present plural trimming results to the user. This allows the user to select the image object according to their own preference. Additionally, since the image object is arranged such that the "object" fits within the image arrangement region 1003, it is possible to address the problem that the "object" is not shown in the image object displayed in the document data or that the "object" is partially cut off.

Figure 11B:
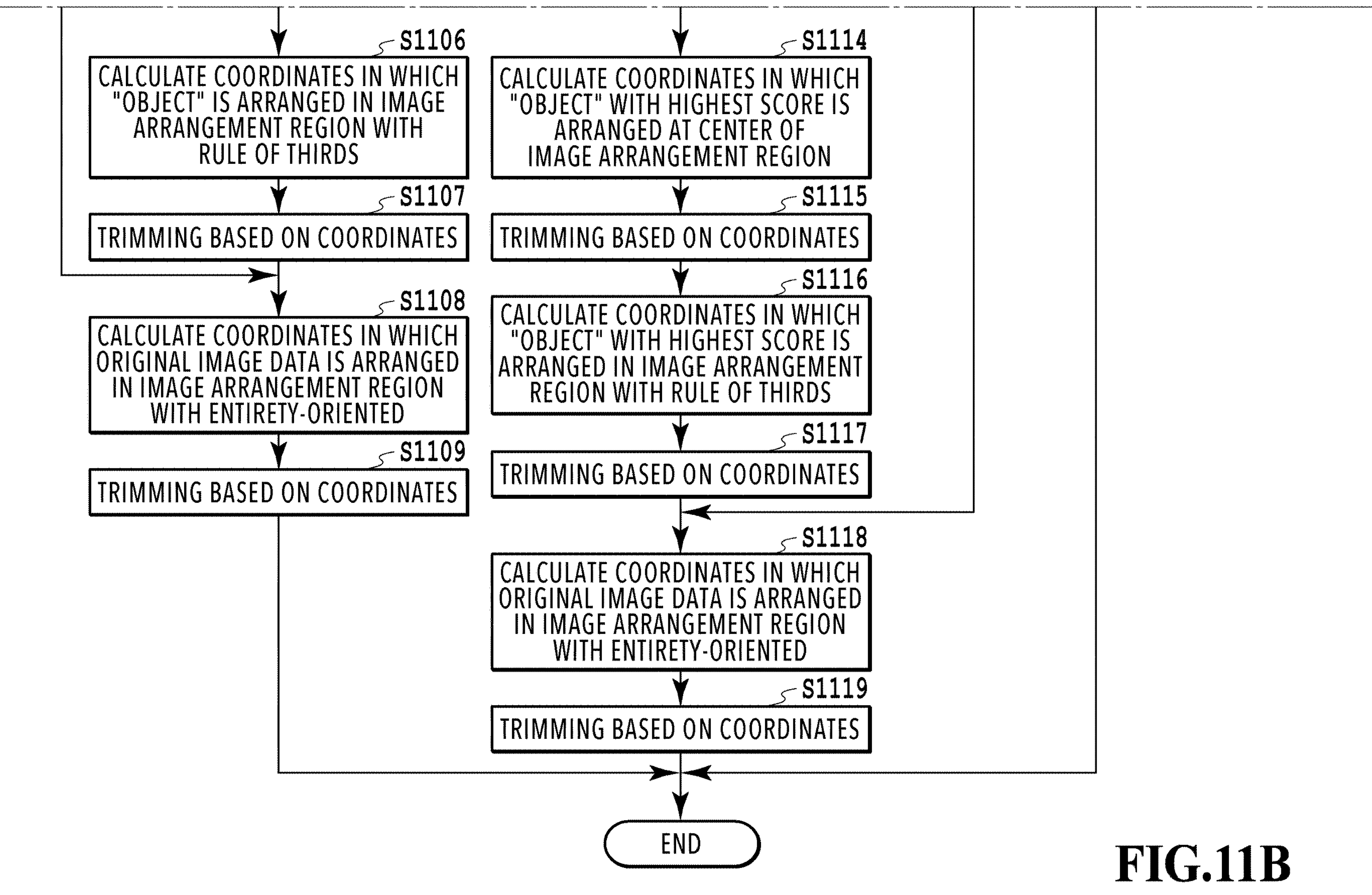
FIG. 11 is a diagram showing the relationship of FIGS. 11A and 11B, and FIGS. 11A and 11B are flowcharts illustrating trimming processing.

FIGS. 11A and 11B are flowcharts specifically illustrating the image trimming processing indicated in S411 to S414 in FIG. 4B. The processing in S1101 corresponds to the processing in S411 in FIG. 4B. Additionally, the processing in S1102 to S1109 corresponds to the processing in S412 in FIG. 4B, the processing in S1110 to S1119 corresponds to the processing in S413 in FIG. 4B, and the processing in S1120 and S1121 corresponds to the processing in S414 in FIG. 4B. FIGS. 4A and 4B show the processing to determine which trimming range determination condition to use based on the contents (the number and the size of the object) of the image arranged in the image arrangement region and to perform the trimming in the trimming range based on the determined trimming condition.

First, in S1101, taking into consideration the number of the "object" detected in S410, the central processing unit 202 determines which photograph pattern the original image data is. This determination corresponds to the processing in S411 in FIG. 4B. Note that, although the photograph pattern is determined based on the number of the "object" in the present embodiment, a criterion for the determination is not limited thereto. For example, the type of the "object" detected in S410 may be taken into consideration, or the position of the "object" may be taken into consideration. Alternatively, the photograph pattern of the original image data may be determined based on a combination of the above conditions. In S1101, if the number of the "object" is one, the central processing unit 202 determines that it is a photograph having a characteristic of focusing on the detected one "object" and performs the trimming processing on the original image data. This photograph pattern is referred to as the "first photograph pattern". In a case where the trimming processing on the original image data is completed, the processing proceeds to S1102.

In S1102, the central processing unit 202 determines whether the detected "object" is sufficiently great with respect to the entire image. That is, the central processing unit 202 determines the size of the "object" based on whether the size of the detected "object" is equal to or greater than a predetermined proportion with respect to the size of the entire original image data. In the present embodiment, the central processing unit 202 determines the size of the "object" based on whether the size of the "object" occupies 5% or greater of the entire original image data. Note that, the predetermined proportion is not limited to 5%. The value of the predetermined proportion may be set to an appropriate value by inputted by the user. In a case where the central processing unit 202 determines that the "object" does not have a sufficient size (the size of the "object" is smaller than the predetermined proportion), the processing proceeds to S1108. In a case where the central processing unit 202 determines that the "object" has a sufficient size (the size of the "object" is equal to or greater than the predetermined proportion), the processing proceeds to S1103.

In a case where the central processing unit 202 determines that the "object" does not have a sufficient size, and the trimming based on the "object" is performed, only a small range of the original image data is trimmed. Accordingly, there is a high possibility that the trimmed image object is different from the expectation of the user. Therefore, in S1108, the central processing unit 202 calculates coordinates for the entirety-oriented arrangement, and the processing proceeds to S1109. In S1109, the central processing unit 202 trims the original image data based on the calculated coordinates. In a case where the pattern is the first photograph pattern, and the "object" does not have a sufficient size, one trimming result is obtained.

In S1102, if the central processing unit 202 determines that the "object" has a sufficient size, in S1103, the central processing unit 202 calculates the reference point in the "object". In the present embodiment, the central processing unit 202 uses the coordinates of the center of the "object" as a reference, and the processing proceeds to S1104. In S1104, the central processing unit 202 calculates the coordinates for a case of the trimming with the central arrangement. The central processing unit 202 calculates the coordinates by using the reference point calculated in S1103, and the processing proceeds to S1105. In S1105, the central processing unit 202 trims the original image data based on the coordinates calculated in S1104. In a case where the trimmed image object does not have a size filling the image arrangement region, or the trimmed image object does not fit within the image arrangement region, the central processing unit 202 adjusts the coordinates such that the image object has an appropriate size and fits within the image arrangement region. In a case where the trimming is performed, the processing proceeds to S1106.

In S1106, the central processing unit 202 calculates the coordinates for a case of the trimming with the rule of thirds. In this case, the central processing unit 202 calculates the coordinates by using the reference point calculated in S1103. Additionally, as for the coordinates, the four coordinates of upper left, upper right, lower left, and lower right are calculated, and the processing proceeds to S1107. In S1107, the central processing unit 202 trims the original image data based on the coordinates calculated in S1106. Since the number of the coordinates calculated in S1106 is four, in S1107, four trimming results are obtained. In a case where the trimmed image object does not have a size filling the image arrangement region, or the trimmed image object does not fit within the image arrangement region, the central processing unit 202 adjusts the coordinates such that the image object has an appropriate size and fits within the image arrangement region. In a case where the trimming is performed, the processing proceeds to S1108.

In S1108 and S1109, the above-described entirety-oriented trimming is performed on the original image data. In a case where the pattern is the first photograph pattern, and the central processing unit 202 determines that the "object" has a sufficient size, six trimming results are obtained. In a case where the processing in S1109 is completed, the processing in the flowcharts illustrated in FIGS. 11A and 11B is finished.

Subsequently, the trimming processing in a case where the number of the "object" is equal to or greater than two and equal to or smaller than a predetermined number in S1101 is described. Hereinafter, in the present embodiment, description is given assuming that the predetermined number is nine. The central processing unit 202 determines that it is a photograph having a characteristic of focusing on either one of the plural pieces of detected "object" or it is a photograph having a characteristic of focusing on all the pieces of "object". The central processing unit 202 performs the trimming processing according to the above-described characteristics. This photograph pattern is referred to as the "second photograph pattern". Although a threshold of the number of the "object" for categorizing to the second photograph pattern is nine in the present embodiment, it is not limited thereto. The user may change the threshold of the number of the "object" every time depending on a detection result of the "object" and another factor.

In the trimming processing of the second photograph pattern, in order to determine the "object" to be focused out of the plural pieces of detected "object", first, in S1110, the central processing unit 202 calculates a score of each of all the pieces of detected "object". In the present embodiment, the score is calculated based on an area of the detected "object" and a concordance rate of the object detection. Note that, in the present specification, a "probability that the detected object is the concerned object" calculated from a result of the object detection is referred to as the "concordance rate". In a case where the concordance rate is high, it is construed that the object is explicitly detected, that is, the "object" is clearly shown in the photograph. In a case where the central processing unit 202 calculates the scores of all the pieces of "object", the processing proceeds to S1111.

In S1111, the central processing unit 202 calculates the "object" with the highest score, and the processing proceeds to S1112. Based on this "object", the subsequent trimming processing is performed. In S1112, the central processing unit 202 determines whether the "object" with the highest score is sufficiently great with respect to the entire image. In the present embodiment, it is based on whether the size of the "object" occupies 5% or greater of the entire original image data. That is, the central processing unit 202 performs the determination based on whether the size of the "object" with the highest score with respect to the size of the entire original image data is equal to or greater than the predetermined proportion. Note that, the predetermined proportion is not limited to 5%. The value of the predetermined proportion may be set to an appropriate value by inputted by the user independent of the value determined in S1102. In a case where the central processing unit 202 determines that the "object" does not have a sufficient size, the processing proceeds to S1118. In a case where the central processing unit 202 determines that the "object" has a sufficient size, the processing proceeds to S1113.

In S1112, in a case where the central processing unit 202 determines that the "object" does not have a sufficient size, because of the reason similar to that of the case of the first photograph pattern, in S1118, the central processing unit 202 calculates the coordinates for the entirety-oriented arrangement, and the processing proceeds to S1119. In S1119, the central processing unit 202 trims the original image data based on the calculated coordinates. In a case where the pattern is the second photograph pattern, and the "object" with the highest score does not have a sufficient size, one trimming result is obtained.

In S1112, if the central processing unit 202 determines that the "object" with the highest score has a sufficient size, in S1113, the central processing unit 202 calculates the reference point in the "object" with the highest score. In the present embodiment, the coordinates of the center of the "object" with the highest score is used as a reference, and the processing proceeds to S1114. In S1114, the central processing unit 202 calculates the coordinates for a case of the trimming with the central arrangement. The central processing unit 202 calculates the coordinates by using the reference point calculated in S1113, and the processing proceeds to S1115. In S1115, the central processing unit 202 trims the original image data based on the coordinates calculated in S1114. In a case where the trimmed image object does not have a size filling the image arrangement region, or the trimmed image object does not fit within the image arrangement region, the central processing unit 202 adjusts the coordinates such that the image object fits within the image arrangement region. In a case where the trimming is performed, the processing proceeds to S1116.

In S1116, the central processing unit 202 calculates the coordinates for a case of the trimming with the rule of thirds. In this case, the central processing unit 202 calculates the coordinates by using the reference point calculated in S1113. Additionally, as for the coordinates, the four coordinates of upper left, upper right, lower left, and lower right are calculated, and the processing proceeds to S1117. In S1117, the central processing unit 202 trims the original image data based on the coordinates calculated in S1116. Since the number of the coordinates calculated in S1116 is four, in S1117, four trimming results are obtained. In a case where the trimmed image object does not have a size filling the image arrangement region, or the trimmed image object does not fit within the image arrangement region, the central processing unit 202 adjusts the coordinates such that the image object has an appropriate size and fits within the image arrangement region. In a case where the trimming is performed, the processing proceeds to S1118.

In S1118 and S1119, the above-described entirety-oriented trimming is performed on the original image data. In a case where the pattern is the second photograph pattern, and the central processing unit 202 determines that the "object" with the highest score has a sufficient size, six trimming results are obtained. In a case where the processing in S1119 is completed, the processing in the flowcharts illustrated in FIGS. 11A and 11B is finished.

Next, in S1101, in a case where the number of the "object" is greater than the threshold of the second photograph pattern or is zero, the central processing unit 202 determines that the original image data is a photograph having a characteristic of focusing on no "object". The central processing unit 202 performs the entirety-oriented trimming processing on the original image data. This photograph pattern is referred to as the "third photograph pattern". In the trimming processing of the third photograph pattern, since the "object" is not focused, the central processing unit 202 performs only the entirety-oriented trimming. In S1120, the central processing unit 202 calculates the coordinates for the entirety-oriented arrangement, and the processing proceeds to S1121. In S1121, the central processing unit 202 trims the original image data based on the calculated coordinates. In a case where the trimming is completed, the processing in the flowcharts illustrated in FIGS. 11A and 11B is finished. Accordingly, in a case where the pattern is the third photograph pattern, one trimming result is obtained.

<About Method of Generating, Displaying, and Selecting Candidate of Document Data>

Figure 12:
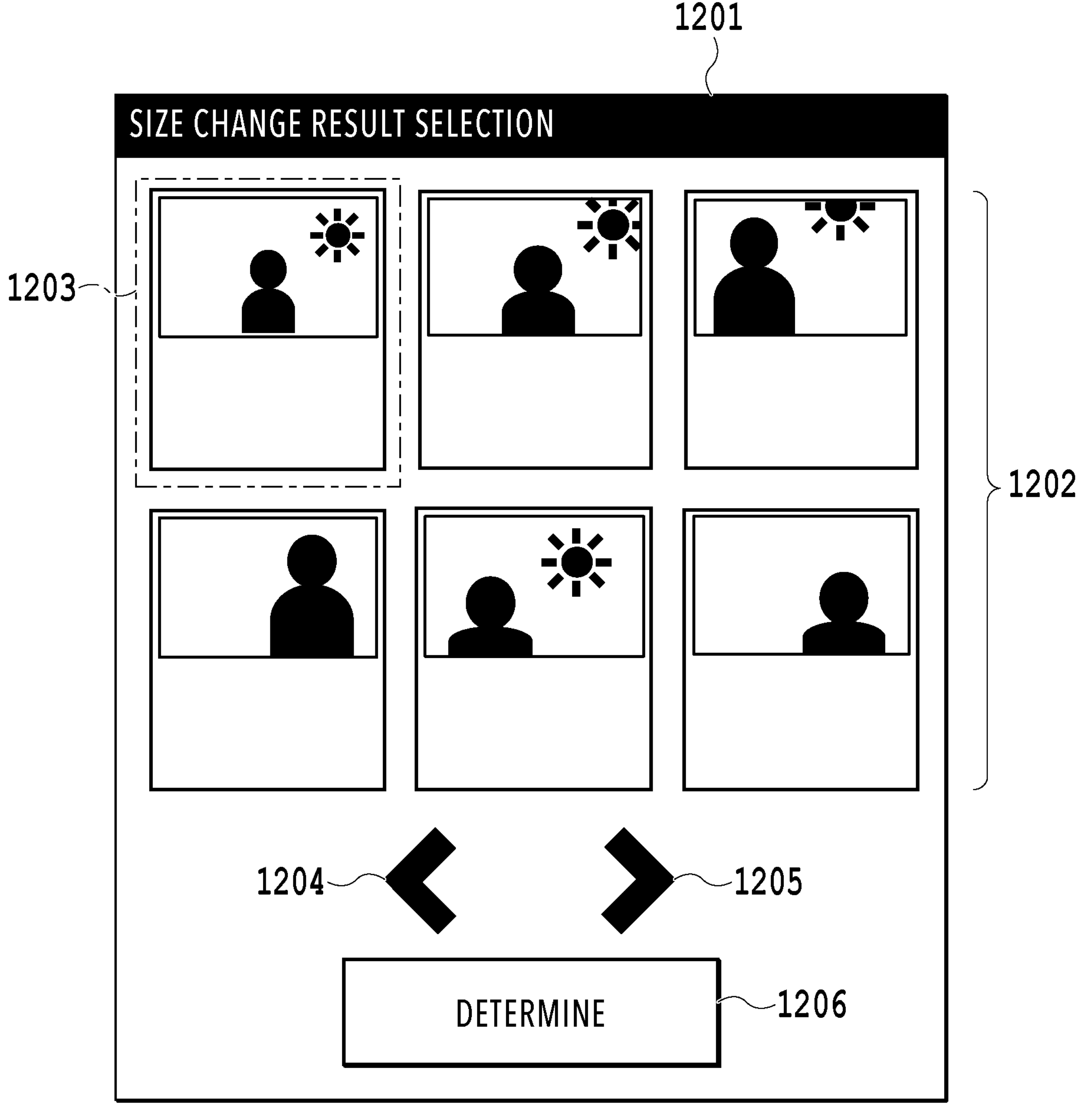
FIG. 12 is a diagram illustrating a document selection screen.

FIG. 12 is an example of a document selection screen that is displayed in S416 and that displays the candidates of the document data generated by the candidate generation unit 321. In S415, the candidate generation unit 321 generates the candidates of the adjusted document data by using the trimming results obtained from the processing in S411 to S414. The candidates of the document data may include a variation from the adjustment of the object other than the image object that is obtained in the processing in S406. A document selection screen 1201 illustrated in FIG. 12 includes a result display region 1202 in which thumbnails of the candidates of the document data that are generated in the processing in S415 are arrayed and displayed. The thumbnail display of the candidates of the document data is performed by the candidate display control unit 322. The order of arraying the thumbnails in the result display region 1202 in the present embodiment is the order of the trimming results from the entirety-oriented, the central arrangement, the rule of thirds (upper left), the rule of thirds (upper right), the rule of thirds (lower left), and the rule of thirds (lower right). However, the display order of the thumbnails of the candidates of the document data is not limited thereto.

Note that, in a case where there are plural image objects in the candidate of the document data, the trimming result in which the trimming position is changed is used for only the image object that corresponds to the condition of diverging to S1103 or S1113 in S1102 or S1112. The entirety-oriented trimming result is used for the image object that does not correspond to the condition of diverging to S1103 or S1113. For example, in a case of the candidate of the document data including two image objects A and B therein, assuming that the image object A has the above-described six trimming results, and the image object B has the entirety-oriented trimming result. On the document selection screen, six thumbnails of the candidates of the document data are displayed while the six trimming results are displayed for the image object A, and the entirety-oriented trimming result is displayed for the image object B. In S417, in a case where the user selects the trimming result of the central arrangement for the image object A, the document data in which the trimming result of the central arrangement is arranged for the image object A and the entirety-oriented trimming result is arranged for the image object B is selected.

Additionally, the maximum display number is set in the result display region 1202. In a case where the number of the generated candidates of the document data exceeds the maximum display number, in response to pressing of a page forward button 1205 or a page back button 1204 by the user, the candidate display control unit 322 switches the contents displayed in the result display region 1202. Note that, the page forward button 1205 and the page back button 1204 are not displayed in a case where the number of the generated candidates of the document data does not exceed the maximum display number. In S417, the user can select one desired candidate of the document data from the thumbnails of the documents displayed in the result display region 1202 by using the input device 201. A selection frame 1203 is displayed around the candidate of the document data selected by the user to clearly indicate which candidate of the document data is currently selected. In a case where the user presses a determination button 1206 by using the input device 201, the document data is determined. In a case where the user presses the determination button 1206, the candidate selection reception unit 323 obtains the candidate of the document data around which the selection frame 1203 is displayed. In a case where the candidate of the document data around which the selection frame 1203 is displayed is obtained, in S418, the document display editing unit 303 displays the selected candidate of the document data on the display device 203. The document data displayed on the display device 203 by the document display editing unit 303 can receive the editing by the user in S419. Thus, the user can perform fine adjustment and additional editing as needed on the adjusted document data.

According to the present embodiment, in a case where the aspect ratio of the document data is adjusted according to the change of the aspect ratio of the sheet size, and the aspect ratio of the image arrangement region is changed, it is possible to present the trimming result matching the changed image arrangement region to the user. Thus, the usability of the trimming in a case of changing the aspect ratio of the sheet size is improved.

<Other Modifications>

In the present embodiment, an example in which the thumbnails of the candidates of the document data are displayed on the display device 203 is described. However, the display method is not limited thereto. The present embodiment also includes a mode of arraying and displaying only the trimming results or a mode of displaying the thumbnail in which the trimming result is arranged in the image arrangement region and nothing is arranged in another region in the entire document data.

In the present embodiment, all the plural trimming results generated in S411 to S414 are used in the generation of the candidates of the document data in S415. However, the trimming result to be used may be narrowed down based on particular conditions. For example, for every image object, the central processing unit 202 compares plural trimming ranges based on the different trimming range determination conditions. For example, in a case where the central processing unit 202 determines that the trimming result of the central arrangement and the entirety-oriented trimming result are similar, only one of the trimming results is used to generate the candidate of the document data. The other trimming result is not used, and thus it is possible to prevent displaying of the candidates of the document data having a difference that cannot be determined visually in S416. That is, one trimming range is selected from a group of similar trimming ranges out of the plural trimming ranges based on the different trimming range determination conditions.

The following two methods can be considered as the method of determining the similarity. The first method is a method of determining how much the two trimming results are overlapped. Hereinafter, a case where the trimming results are rectangular is described. Since the coordinates for the trimming form a rectangle including four points, the central processing unit 202 determines that the two trimming results are similar in a case where the overlap between the rectangles is equal to or greater than a predetermined amount. For example, in a case where the predetermined amount is set to 80% or greater, the central processing unit 202 determines that the two trimming results are similar in a case where the overlap between the two trimming results is 80% or greater. The predetermined amount is not limited to 80%, and it is possible to set to an appropriate value by inputted by the user. The second method is a method of calculating an image similarity degree by using a machine learning model. The central processing unit 202 determines that the trimming results are similar if the similarity degree of the two trimming results is equal to or greater than the predetermined amount. How much similarity degree "similar" indicates is different depending on the model. For example, the central processing unit 202 determines that the trimming results are similar in a case where the calculated similarity degree is 0.9 or greater. The predetermined amount is not limited to 0.9, and the user can set an appropriate value.

In the present embodiment, in the generation of the candidates of the document data in S415, only the trimming results generated in the processing in S411 to S414 are used. The original image data may be trimmed in the trimming position before the adjustment due to the change of the sheet size is performed, and the image data that is after the enlarging or reducing vertically and horizontally according to the aspect ratio of the image arrangement region may be trimmed. Additionally, the results thereof may be also included in the candidates of the document data. It is possible to present the trimming result in which a portion displayed in the image arrangement region in the original image data is constant regardless of the adjustment due to the change of the size and the trimming result that is favorable in a case where the original image data is not a photograph but is a graphic or the like that is preferred to change the aspect ratio. According to the technique of the present embodiment, in a case where the aspect ratio of the document is changed, the image arranged on the document with the changed aspect ratio becomes an image that is trimmed more favorably.

Second Embodiment

In a second embodiment, an aspect in which generation results of the candidates of the document data are randomly displayed is described. In the first embodiment, in a case where the generated candidates of the document data are displayed, the candidates of the document data using the trimming results are displayed in the particular order, and in a case where there are plural image objects included in the document data, only the image that satisfies the conditions is displayed after changing the trimming position. In contrast, in the present embodiment, in a case where there are plural image objects included in the document data, the candidate generation unit 321 generates the candidates of the document data by combining various trimming results. The candidate display control unit 322 randomly displays the thumbnails of the generated candidates of the document data. Note that, S401 to S414 illustrated in the flowcharts in FIGS. 4A and 4B in the first embodiment are the same as the processing of the present embodiment; for this reason, description is omitted.

In a case where the trimming results obtained from the processing in S411 to S414 are used to generate the adjusted candidates of the document data, in a case where there are plural image objects included in the document data, the following processing is performed. That is, the candidate generation unit 321 randomly combines the trimming results of the image objects and generates the candidates of the document data. The candidate display control unit 322 randomly displays the thumbnails of the generated candidates of the document data on the result display region 1202. Additionally, in a case where the number of the candidates of the document data generated by the candidate generation unit 321 exceeds the maximum display number of the result display region 1202, the following processing is performed. In a case where the user presses the page forward button 1205, the candidate display control unit 322 re-extracts the thumbnail of the candidate of the document data to be displayed, and the thumbnail that is re-extracted is displayed in the result display region 1202. In this case, the thumbnail of the candidate of the document data that is displayed once is not displayed again. Additionally, in a case where the user presses the page back button 1204, the candidate display control unit 322 does not execute the re-extraction of the thumbnail of the candidate of the document data and displays the display result of the thumbnail that is displayed before. As above, according to the present embodiment, in addition to the effect described in the first embodiment, it is possible to present the candidates of the document data in various variations.

Third Embodiment

In a third embodiment, a display mode that takes into consideration the usability in a case where there are many generation results of the candidates of the document data is described. In a case where the trimming processing described in the first embodiment is performed, and all the results that can be generated are displayed as described in the second embodiment, there is a possibility that there are considerably many generation results of the candidates of the document data. For example, in a case of the document data including two image objects, up to 36 patterns of the candidates are generated, and in a case of the document data including three image objects, up to 216 patterns of the candidates are generated. In a case where the user tries to select a favorable one from the candidates, in the display method of the second embodiment, for example, in a case where there are three image objects, there is a possibility that it is necessary to check 216 patterns of the candidates across 36 pages on a generated document selection screen. Accordingly, selecting of a favorable candidate by the user becomes cumbersome.

Figure 13:
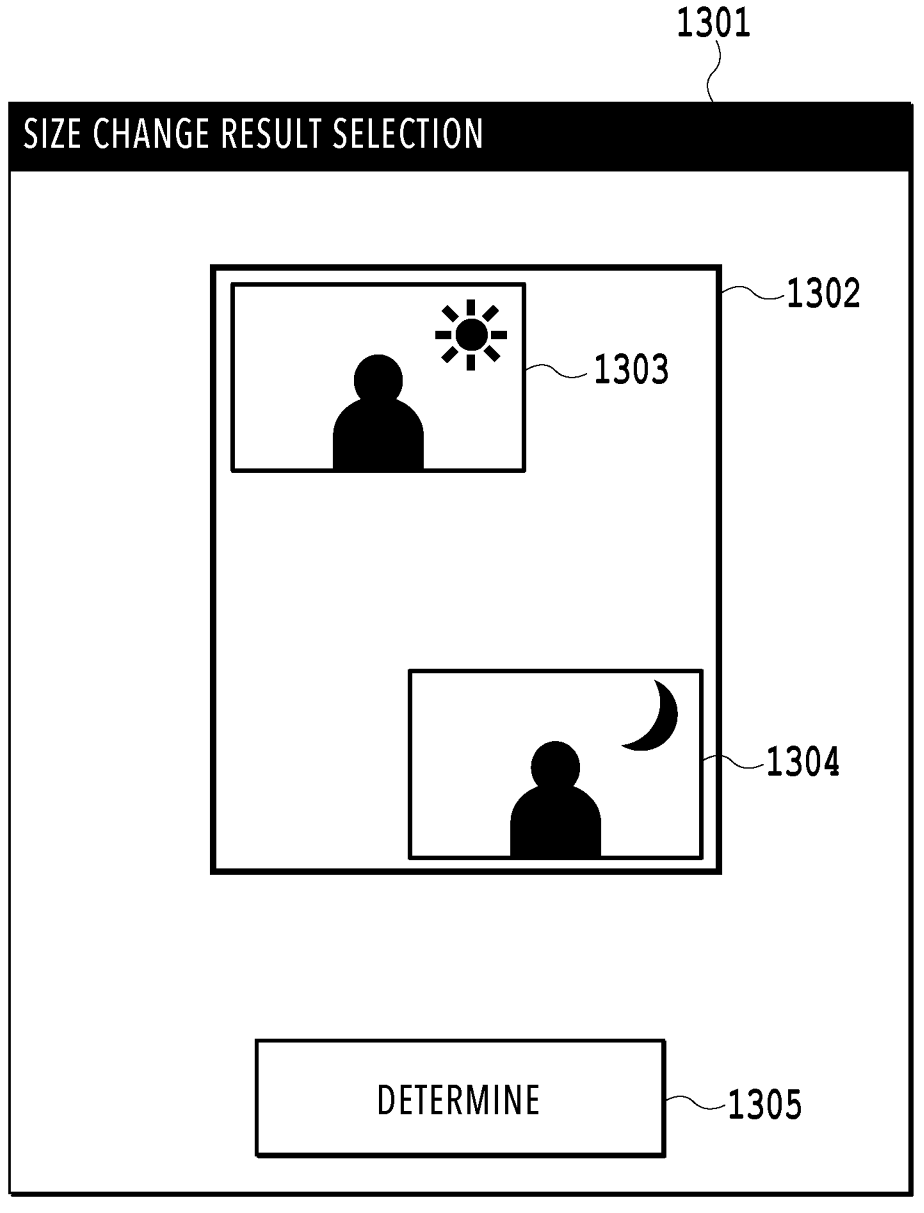
FIG. 13 is a diagram illustrating a document selection screen.

In contrast, in the third embodiment, it is possible for the user to select the trimming result to be used for each image object. Note that, in the third embodiment, assuming that the processing of S401 to S415 in FIGS. 4A and 4B in the first embodiment is already performed. In a case where the adjustment of each object is completed in S415, the central processing unit 202 generates a preview of the adjusted document data and displays the preview on a generated document selection screen 1301 illustrated in FIG. 13. In this process, in a case of the image object that may have plural results, the preview is generated based on a default result. In the present embodiment, the entirety-oriented trimming result is default. The generated document selection screen 1301 displays a preview 1302 indicating the finished image of the adjusted document data at the current point and a determination button 1305. In the example in FIG. 13, two image objects 1303 and 1304 are displayed on the preview 1302. In this process, it is possible to display the image objects so as to be able to distinguish between the image object from which only one trimming result is generated and the image object from which plural trimming results are generated. For example, a colored frame may be displayed around the image object from which plural trimming results are generated, and a frame of a different color from that of the image object from which plural trimming results are generated may be displayed around the image object from which only one trimming result is generated. The any number and the any arrangement of the image objects can be used. Additionally, in a case where there is an object other than the image object in the document before change, an adjustment result of the object is also displayed on the preview 1302.

Figure 14:
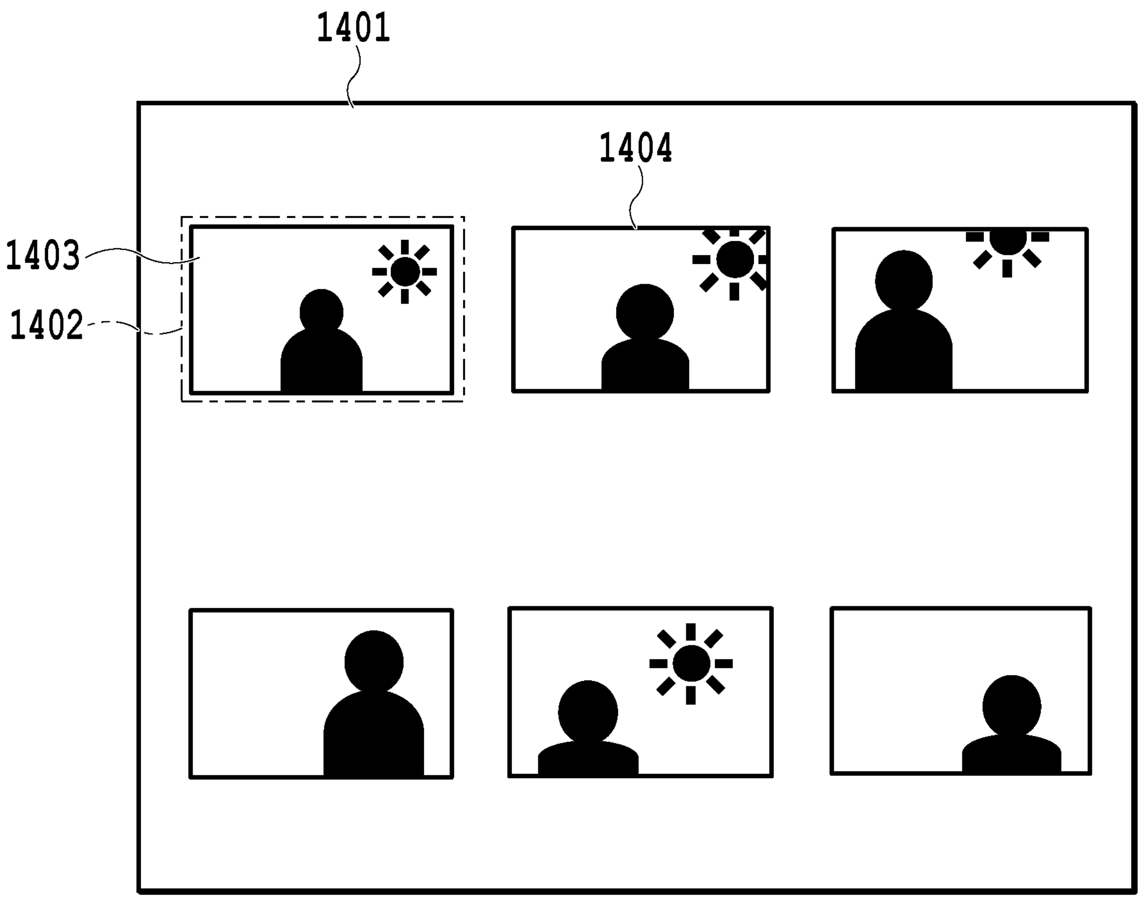
FIG. 14 is a diagram illustrating a trimming candidate selection screen.

In a case of using another trimming result for a certain image object, the user can display a trimming candidate selection screen by clicking a mouse on the image object 1303 or 1304 on the preview 1302. In a case of using an operation panel or a touch panel, it is possible to display the trimming candidate selection screen with the user touching the image object 1303 or 1304. Hereinafter, description is given using an example of using the mouse; however, it is possible to perform a similar operation by using the operation panel or the touch panel. In this case, the trimming candidate selection screen is displayed to be overlapped with the generated document selection screen 1301 as a popup screen. The trimming candidate selection screen displays all the trimming results of the image object selected from the generated document selection screen 1301. For example, the trimming candidate selection screen displayed by pressing the image object 1303 is illustrated in FIG. 14.

A trimming candidate selection screen 1401 displays all the trimming results of the image object 1303 that are obtained in S409 to S415. In the present embodiment, there are six patterns of the trimming results of the image object 1303. In FIG. 14, the trimming result currently displayed as a preview is a trimming result 1403, and a selection frame 1402 indicating that it is the trimming result of the currently displayed preview is displayed. The user voluntarily selects one of the trimming results displayed on the trimming candidate selection screen 1401. It is possible to reflect the selection on the preview 1302 by clicking the mouse on the selected trimming result. This operation can be also implemented by additionally providing a determination button. The selection of the desired trimming result by the user is received, and the selection frame is displayed around the selected trimming result. Thereafter, the central processing unit 202 may reflect the selection on the preview 1302 with the user clicking the mouse on the determination button.

Figure 15:
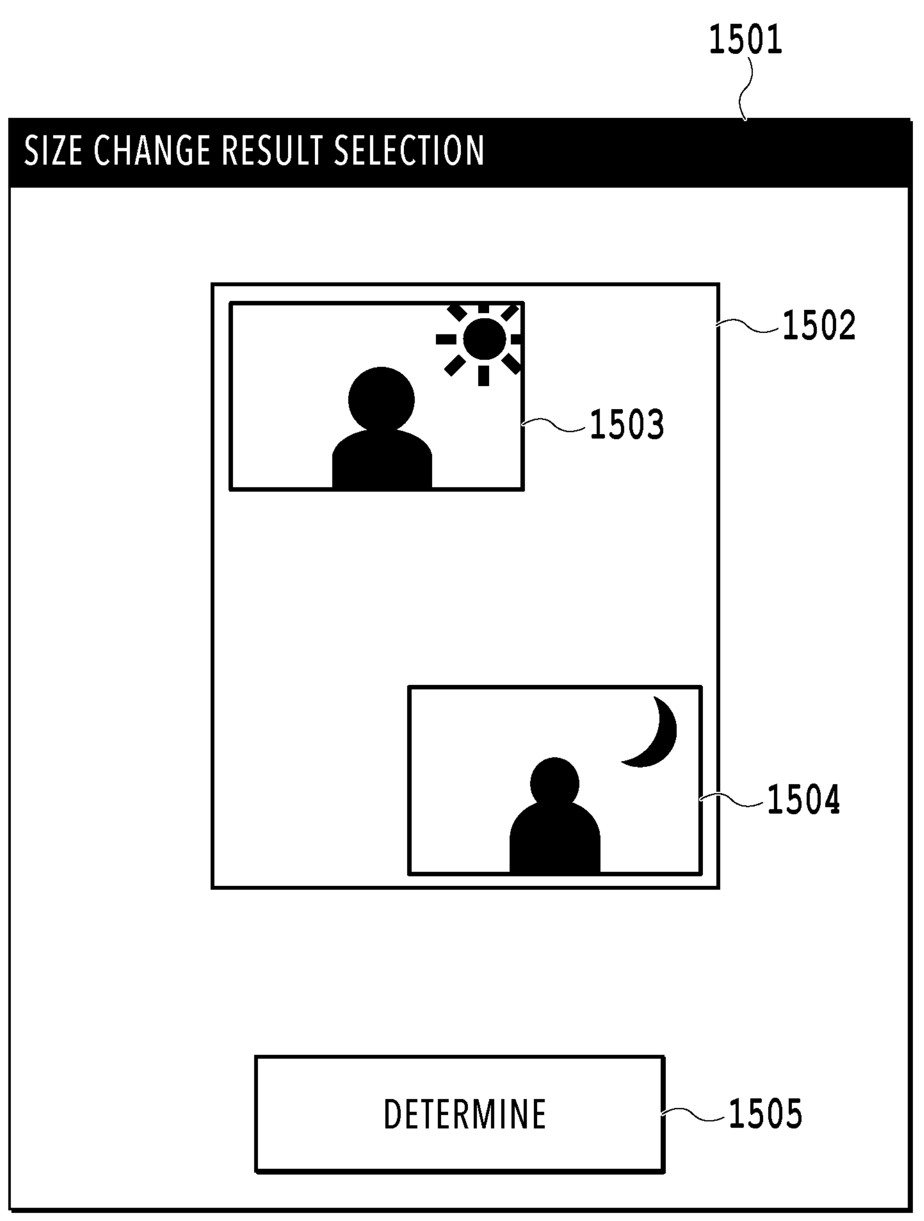
FIG. 15 is a diagram illustrating a document selection screen in which a trimming result of the image object is revised.

A trimming result 1404 is selected on the trimming candidate selection screen 1401, and the generated document selection screen reflecting the selection is illustrated in FIG. 15. The selection from the trimming candidate selection screen 1401 is reflected, and the trimming result displayed for an image object 1503 is changed to the image object of the trimming result 1404. Likewise, regarding an image object 1504, once the user clicks the mouse on the image object 1504, the trimming candidate selection screen 1401 is displayed. The user can select a desired trimming result also for the image object 1504. Note that, the trimming candidate selection screen 1401 can be displayed any number of times by clicking the mouse on the image object, and the user can select the trimming result again. Additionally, it is possible to perform the displaying such that the user confirms the image object 1303 for which the trimming result is changed. For example, a frame of a different color from that of the above-described frame indicating whether there is one trimming result may be displayed around the image object for which the trimming result is changed.

After the user changes the trimming result of any image object, it is possible to determine the adjustment on all the image objects in the document data by clicking the mouse on a determination button 1505. In response to the clicking of the mouse on the determination button 1505, the candidate selection reception unit 323 obtains a current state of the preview 1502. The document display editing unit 303 displays the adjusted document data having the obtained preview 1502 on the display device 203. The displayed document data can be edited by the user. Thus, the user can perform fine adjustment and additional editing as needed on the adjusted document data.

As above, according to the third embodiment, in a case where there are plural image objects from which plural trimming results are generated in the document data, it is possible to present all the trimming results to the user with one screen without switching plural pages. Therefore, the usability is improved.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-038677, filed Mar. 13, 2023, which is hereby incorporated by reference wherein in its entirety.

What is claimed is:

1. An information processing apparatus, comprising:

(A) at least one memory and at least one processor and/or (B) at least one circuit, which function as:

(1) a reception unit configured to receive an instruction to change an aspect ratio of a document including an image arrangement region;

(2) an adjustment unit configured to change the aspect ratio of the document and also adjust an aspect ratio of the image arrangement region, based on the instruction received by the reception unit;

(3) a control unit configured to perform control to perform trimming of an image arranged in the image arrangement region based on the aspect ratio of the image arrangement region adjusted by the adjustment unit; and (4) a display control unit configured to perform control to display, on a display unit, the document in which the aspect ratio is changed based on the instruction and in which the image trimmed by the control unit is arranged in the adjusted image arrangement region, wherein, in a case where the number of objects detected from the image arranged in the image arrangement region is two or greater and smaller than a first predetermined number, the control unit performs control to perform trimming in a trimming range determined based on different conditions depending on an area of the object and a score calculated by using a concordance rate of object detection.

2. The information processing apparatus according to claim 1, wherein the display control unit performs control to display, on the display unit, a plurality of the documents in which the aspect ratio is changed based on the instruction and in which a plurality of trimmed images trimmed in different trimming ranges in the images by the control unit are arranged in the adjusted image arrangement region.

3. The information processing apparatus according to claim 2, further comprising:

a selection unit configured to select either one of the plurality of the documents in which the aspect ratio is changed based on the instruction, based on a user operation.

4. The information processing apparatus according to claim 3, wherein the control unit changes a trimming range of an image arranged in the document selected by the selection unit, based on a user operation.

5. The information processing apparatus according to claim 2, wherein the display control unit performs control to display, on the display unit, the plurality of the documents in which the trimmed image is arranged in the adjusted image arrangement region, and nothing is arranged in another region.

6. The information processing apparatus according to claim 1, wherein the display control unit performs control to display, on the display unit, a plurality of trimmed images trimmed by the control unit in different trimming ranges in the image, and to display, on the display unit, the document in which the aspect ratio is changed based on the instruction and in which the trimmed image selected from the plurality of the trimmed images by a user operation is arranged in the adjusted image arrangement region.

7. The information processing apparatus according to claim 1, further comprising:

an output unit configured to output the changed document displayed by the display control unit in a printable state.

8. The information processing apparatus according to claim 1, wherein in a case where the object with the highest score occupies equal to or greater than a second predetermined proportion of the image, the control unit performs control to perform trimming in a trimming range in which the object is arranged at a center, trimming ranges using rule of thirds, and a trimming range in which at least one of a vertical range and a horizontal range of entirety of the image fits within the image arrangement region.

9. A method of controlling an information processing apparatus, the method comprising:

receiving an instruction to change an aspect ratio of a document including an image arrangement region;

changing the aspect ratio of the document and also adjusting an aspect ratio of the image arrangement region, based on the instruction received in the receiving;

trimming an image arranged in the image arrangement region based on the aspect ratio of the image arrangement region adjusted in the adjusting; and displaying, on a display unit, the document in which the aspect ratio is changed based on the instruction and in which the image trimmed in the controlling is arranged in the adjusted image arrangement region, wherein, in a case where the number of objects detected from the image arranged in the image arrangement region is two or greater and smaller than a first predetermined number, in the trimming, trimming is performed in a trimming range determined based on different conditions depending on an area of the object and a score calculated by using a concordance rate of object detection.

10. A non-transitory computer-readable storage medium storing a program for causing a computer to perform a method of controlling an information processing apparatus, the method comprising:

receiving an instruction to change an aspect ratio of a document including an image arrangement region;

changing the aspect ratio of the document and also adjusting an aspect ratio of the image arrangement region, based on the instruction received in the receiving;

trimming an image arranged in the image arrangement region based on the aspect ratio of the image arrangement region adjusted in the adjusting; and displaying, on a display unit, the document in which the aspect ratio is changed based on the instruction and in which the image trimmed in the controlling is arranged in the adjusted image arrangement region, wherein, in a case where the number of objects detected from the image arranged in the image arrangement region is two or greater and smaller than a first predetermined number, in the trimming, trimming is performed in a trimming range determined based on different conditions depending on an area of the object and a score calculated by using a concordance rate of object detection.

* * * * *